(12) United States Patent
Nishiyama

(10) Patent No.: US 8,140,498 B2
(45) Date of Patent: Mar. 20, 2012

(54) DISTRIBUTED DATABASE SYSTEM BY SHARING OR REPLICATING THE META INFORMATION ON MEMORY CACHES

(75) Inventor: Shuhei Nishiyama, Ichikawa (JP)

(73) Assignee: Shuhei Nishiyama, Urayasu Chiba (JP)

( * ) Notice: Subject to any disclaimer, the term of this patent is extended or adjusted under 35 U.S.C. 154(b) by 27 days.

(21) Appl. No.: 12/778,124

(22) Filed: May 12, 2010

(65) Prior Publication Data

US 2010/0293140 A1 Nov. 18, 2010

(30) Foreign Application Priority Data

May 18, 2009 (JP) .................................. 2009-119363
Sep. 23, 2009 (JP) .................................. 2009-218337

(51) Int. Cl.
*G06F 17/30* (2006.01)
(52) U.S. Cl. ....................................................... 707/704
(58) Field of Classification Search .................... 707/704
See application file for complete search history.

(56) References Cited

U.S. PATENT DOCUMENTS

| | | | |
|---|---|---|---|
| 6,370,529 B1* | 4/2002 | Kruglikov et al. ............ | 707/704 |
| 6,845,384 B2 | 1/2005 | Bamford et al. | |
| 6,952,692 B1* | 10/2005 | Bhattiprolu et al. .......... | 707/704 |
| 7,206,794 B2* | 4/2007 | Rapp ............................. | 707/704 |
| 7,644,087 B2* | 1/2010 | Barkai et al. .................. | 707/770 |
| 2002/0026448 A1* | 2/2002 | Bird et al. .................... | 707/104.1 |
| 2004/0148289 A1* | 7/2004 | Bamford et al. ............... | 707/10 |
| 2006/0149786 A1 | 7/2006 | Nishiyama | |
| 2006/0190243 A1 | 8/2006 | Barkai et al. | |
| 2008/0140937 A1* | 6/2008 | Nalawade et al. ............ | 711/119 |
| 2011/0010338 A1 | 1/2011 | Nishiyama | |

FOREIGN PATENT DOCUMENTS

| | | |
|---|---|---|
| JP | P2002-342138 A | 11/2002 |
| JP | P2006-92503 A | 4/2006 |
| JP | P4313845 | 4/2006 |
| JP | P2007-501456 | 1/2007 |
| JP | P2007-219598 A | 8/2007 |
| JP | P4158534 | 7/2008 |

OTHER PUBLICATIONS

Reply to Non Final Rejection before RCE for US-20060190243 (U.S. Appl. No. 10/357,110).
Reply to Non Final Rejection After RCE for US-20060190243 (U.S. Appl. No. 10/357,110).

* cited by examiner

*Primary Examiner* — Neveen Abel Jalil
*Assistant Examiner* — Kevin Young

(57) ABSTRACT

It is a purpose of this invention to achieve Scale-Out of the distributed database system that assumes a real-time update to be a requirement and which is achieved by dividing the database system into two or more database domains. This is to achieve handling of even larger scale databases while providing even higher performance. Assuming that the large-scale database system has been distributed to two or more of above-mentioned data base domains, in multi transaction processing with real-time update of the database object across two or more of above-mentioned database domain, this invention is achieved by executing the above-mentioned multi transaction processing to the database meta information storage management part in the database meta information management repository device by applying partition topology technology or replication topology technology for exchange and synchronization of meta information such as status information etc. at even higher speeds.

11 Claims, 22 Drawing Sheets

Legends:
☆┄┄☆ Shared Lock Synchronization
△┄┄△ Exclusive Lock Synchronization
◎┄┄◎ Referential Integrity Synchronization
◇┄┄◇ Update Counter Synchronization
★┄┄★ Map Table Synchronization Legends:

D: Distributed Sharing

Legends:
D: Distributed Sharing

Legends:

R: Replicated Synchronization

Legends:
D: Distributed Sharing

Legends:
R: Replicated Synchronization

Legends:

D: Distributed Sharing

Legends:
R: Replicated Synchronization

Legends:
D: Distributed Sharing

Legends:
R: Replicated Synchronization

Legends:

D: Distributed Sharing

Legends:
R: Replicated Synchronization

Legends:

D: Distributed Sharing

Legends:

R: Replicated Synchronization

Legends:
D: Distributed Sharing

Legends:

R: Replicated Synchronization

DISTRIBUTED DATABASE SYSTEM BY SHARING OR REPLICATING THE META INFORMATION ON MEMORY CACHES

FIELD OF INVENTION

The systems and methods of the present invention relate generally to the field of the distributed database system, and the grid computing system that uses it.

BACKGROUND OF THE INVENTION

Past distributed database technology involved a trade-off between processing throughput, and securing of consistency related to distributed transaction processing and exclusive control and of correspondence related to referential integrity. Two-phase commit technology and replication technology have been applied to secure the said consistency and said referential integrity so far, however practicable throughput was not able to be obtained, moreover it is applied to practical use and little has been heard of anyone obtaining sufficient results. On the other hand, when two-phase commit technology or replication technology is not used, possible distributed database of a real-time update has not been put to practical use in the former technology. What is called a distributed database allowing real-time update is actually just a virtual single database system applied to the secondary distributed storage medium. Moreover, on search sites or virtual store sites on the Internet, it is assumed the update system uses batches and the search system uses a distributed reading specialized type distributed database system.

Recently known is the system described in Patent Reference Document 1 shown in FIG. 1 where the distributed database system connects two or more said database domains including a database management system by peer to peer, manages information on status such as structure, exclusive controls of the database arranged and referential integrity during database domains as a meta data besides the main body data, has excellent scalability by mutually exchanging and synchronizing meta information on each same kind of meta information between each of the database domains and makes the database object minimize by a granularity arbitrary, and contributes to the localization of the trouble part and to minimize shortening of the restoration time. A concrete method to exchange said meta information was not referred to in Patent Reference Document 1, but at the time that the technology was developed that was described in Patent Reference Document 1 (the inventor of this invention conceived the idea of this invention around December 2001), the structure of software was becoming complex and installing and maintenance involved difficulty in synchronization by an individual exchange at each said meta information. Therefore, the simplification of the structure is hoped for. Moreover, further speed-up is demanded in recent years when expanding data is assumed to be a problem. The problem was solved this time by the method of the exchange of each small masses of memory equipped with meta information and not by individual exchange of the synchronization of said meta information but the use of partition topology technology and replication technology system, described in Non-Patent Reference Document 1.

Moreover, partition topology technology described in Non-Patent Reference Document 1, constructs 'Cache technology system' on the main memory of two or more computers including the virtual machine as shown in FIG. 2. And each memory cache is shared from two or more computers by the unit of memory cache on the main memory on each computer, and in the system that connects two or more computers not large comparatively and composes a huge-scale virtual machine comparatively, it is known as a technology that constructs a comparatively huge-scale virtual In-memory database system. However, it cannot be said that this is a method of achieving distributed database, and it is a method of achieving a comparatively huge-scale mere virtual single database system. As a result, the localization of the trouble part as storage is possible at the trouble. However, it doesn't become localization of the trouble part as database system. Therefore, the collection of the update journals for making and the roll forward of the snap shot for said consistency and backing up with said the referential integrity kept reaches the whole area of the database, then restoration in a short time is not easy because recovery reaches the entire database system.

Moreover, the technology which only has to access data on the main memory on own computer in the case of accessing data on the main memory on other computers, constructing 'Cache technology system' on the main memory of two or more computers including the virtual machine, making replication of the memory cache on the main memory on each computer, and synchronizing them mutually is described in a page of Non-Patent Reference Document 1 concerned. This is known as 'Replication. However, it doesn't contribute to Scale Out because the shared amount of the memory cache does not increase even if the number of computers increases in this case.

In addition, the composition of general transaction system in which COMMIT is executed if all updates succeed, and in which ROLLBACK is done if as much as one update fails, is indicated in paragraph 0002 of patent document 4. In addition, it is indicated that there are "Nest transaction" and "Chain transaction" in paragraph 0013 as a technique for relating two or more transactions. A detailed explanation concerning "Nest transaction" is indicated in paragraph 0014 and paragraph 0015. Moreover, a detailed explanation concerning "Chain transaction" is indicated in paragraph 0016 and paragraph 0017.

DESCRIPTION OF THE PRIOR ART

Japan Patent No. 4158534 (U.S. patent application Ser. No. 10/542,967) entitled 'Distributed Database System' disclosed on Aug. 12, 2004 and patented on Jul. 25, 2008 by JPO and filed on Mar. 6, 2006 by USPTO (henceforth Patent Reference Document 1).

Japan Patent No. 4313845 disclosed on Apr. 6, 2006 and patented on Aug. 28, 2009 by JPO entitled 'Multi Instance In-memory Database' (henceforth Patent Reference Document 2).

Japan Patent Application No. P2006-522052 (U.S. Pat. No. 6,845,384 filed on Nov. 21, 2003 and patented on Jan. 18, 2005 by USPTO) filed on Jul. 28, 2004 by JPO (henceforth Patent Reference Document 3).

Japan Patent No. 3732113 disclosed on Nov. 29, 2002 and patented on Oct. 21, 2005 by JPO entitled 'Transaction Control System, Method and Program' (henceforth Patent Reference Document 4).

'Distributed In-memory cache and data-grid', UNIX Magazine, April 2009 (quarterly) ASCII MEDIA WORKS (Japan) p. 72-77 (henceforth Non-Patent Reference Document 1)

'Technology of Scale Out', UNIX Magazine, April 2009 (quarterly) ASCII MEDIA WORKS (Japan) p. 78-91 (henceforth Non-Patent Reference Document 2)

SUMMARY OF THE INVENTION

Using neither said '2 phase commits technology' nor said replication technology of each database domain assuming that two or more database management devices are arranged in two or more database domain, the method of achieving the distributed database system that can be the real-time update processing with the mechanism that meta information on the status etc. of each database object in the database management device in database domain of each is exchanged mutually is described in Patent Reference Document 1. However, synchronization by an individual exchange complicates the structure of software, and does implementation and maintenance difficulty at each said meta information. The demand for the simplification of the structure is inevitable, and therefore, the expansion of data is remarkable, and further speed-up is needed in recent years.

The technology that makes part or all of data in the tuple the argument of Consistent Hashing as a method for doing the Scale Out when rows (henceforth tuple) of one table (henceforth relation) becomes a large amount of, and divides the tuple group by Consistent Hashing horizontally is described in Non-Patent Reference Document 2. It is assumed that a flexible correspondence method concerning the addition and removal of physical node that is the physical arrangement of the database object destination is future tasks there. On the other hand, without arranging the divided tuple group directly in physical node when the tuple group is horizontally divided by the hashing to precede Non-Patent Reference Document 2 that describe the technology that uses Consistent Hashing, and to do said Scale Out, it is assumed to be database object set as logic node, logic node and physics node are done in the mapping, and the technology that secures flexibility concerning the addition and the secession of said physical node by a hybrid method of hashing and mapping is described in Patent Reference Document 2. FIG. 20 is a detailed block diagram of Database object management device specific device 907 that implements a hybrid method of hashing and mapping to map logic node and physical node described in Patent Reference Document 2.

Because distributed database in said one database domain is assumed for the horizontal decomposition of the relation with a large amount of tuple described in Patent Reference Document 2, it is needed to correspond to the horizontal decomposition of said relation across two or more database domain for further Scale Out.

FIG. 21 is a detailed block diagram of Database Object Management Device Specific Device '907 and 'Database Meta Information Management Repository Device 500 described in Claim 4 to correspond to the horizontal decomposition of the said relation across two or more database domains.

The method of securing the consistency of the multi and transaction processing in single said database domain for one aspect committing is described in Patent Reference Document 3.

It is described in Patent Reference Document 3 that 2 Phase Commit is necessary to secure the maintenance of the consistency of the multi transaction processing between said Database Domain plurality. Therefore, securing practicable throughput is difficult for multi transaction processing where consistency across two or more said Database Domains is maintained. As a method to secure multi transaction process consistency, the status of each transaction process comprising said multi transaction process holds the status information of the said status for each said single transaction, making it a very complicated process.

The said database management system contributes to high speed through huge-scale and In-memory database management system of partition topology technology described in Non-Patent Reference Document 1, and by linking a plurality of small computers comprising a huge-scale single instance virtual database, so it is not necessary to apply said two-phase commit technology and replication technology for said consistency and said integrity. However, the relation comprising each data set on said small computers comprising said huge-scale single instance virtual database and the set relation and the set meaning the database object like each tuple does not respond directly. Accordingly, said specified database object cannot be located and managed at said small computer that is a specified node. This means that said database object specified is positioned at the small computer that is said node frequently accessed by said database object specified, and said other database object specified is allocated to the small computer that is said node frequently accessed by another database object specified, and that the small computer that is said node and said database object specified cannot be clearly linked and managed. On the other hand, as described in Non-Patent Reference Document 2, said database object group split into easily managed size is allocated to the comparatively easily managed, comparatively small calculating machine that is a special node, and the huge-scale distributed database loosely interconnected with divided said database object is necessary for the independence of the distributed said database object group. This contributes strongly to consistency and integrity of distributed said database object group. However, maintenance of consistency and integrity between said distributed database objects must be done by said two-phase commit technology and replication technology, leaving problems with performance aspects. Also, as described in Non-Patent Reference Document 2, in one relation containing a huge number of tuple, each tuple is assigned a unique ID and when it is discriminated from other tuples, the relationship between the computer having said physical storage apparatus and said ID of that tuple requires flexible dynamic response for participation and quitting (including force quit due to breakdown etc) from a computer system having said physical storage apparatus.

Accordingly, regarding scale out of the distributed database system due to distribution into a plurality of database systems required by real time update, issues faced by this invention were how to deal with further complexity and how to realize further high performance.

Methods to Resolve Issues

This invention distributes a huge-scale database system to said a plurality of database domains, and in said multi transaction process accompanying real time update across said a plurality of database domains, exchanges and synchronizes meta information such as each type of status information comprising data dictionary information, exclusive control information, reference integrity information, and update access counter and database object set identifier location information map table to solve said issues by applying partition topology technology and replication technology system described in Non-Patent Reference Document 1.

Moreover, the update access counter characterized by being identified by process identifier that identifies process that becomes starting point of update access to identify a series of multiple transaction where consistency should be maintained is used in this invention. That is, this invention solves the problem by applying the update access counter technology of which time when the counter returned to an initial value will be considered complete of a series of multiple transaction processing where one consistency should be maintained, by ups and downs of the counter identified by process ID in the process that becomes the starting point of the multiple and transaction processing in stead of the multiple and transaction processing by one phase committing protocol by a unitary sharing of the status of each transaction by the coordinator described in patent document 3.

EFFECTS OF THE INVENTION

Packaging and security of said meta information in the distributed database system described in Patent Reference Document 1 has been simplified, and high speed synchronization is possible for a plurality of memory caches having said meta information, so performance is also improved for said distributed database system described in Patent Reference Document 1 that required synchronization of meta information individually.

The hashing mapping hybrid method described in Patent Reference Document 2 enables efficient horizontal partitioning of relations with a huge number of tuple, and can be spread across said database domain.

Instead of multi transaction processing by one-step commit protocol in the said domain by one dimensional sharing of each transaction status by the coordinator described in Patent Reference Document 3, the multi transaction process spread across a plurality of database domains can be done at high speed by the counter returning to its initial value being recognized as completion of one multi transaction by up-down of the counter recognized by the process ID of the process that is the starting point during multi transaction processing across multiple database domains.

DETAILED DESCRIPTION OF THE PREFERRED EMBODIMENTS

The embodiment of the present invention is explained below using drawings. The present invention is not limited to this embodiment, and can be embodied in a variety of forms within a range that does not deviate from the gist.

Particularly concerning said database management system of the present invention, this does not depend on a relational database or object database and its shape, but in order to make the explanation simple, the present invention is illustrated as a relational database management system in the following embodiment. The definition of relational database system here is based on 'creating a relation from exterior product of tuple and attribute'.

Embodiment 1

Figure 1:
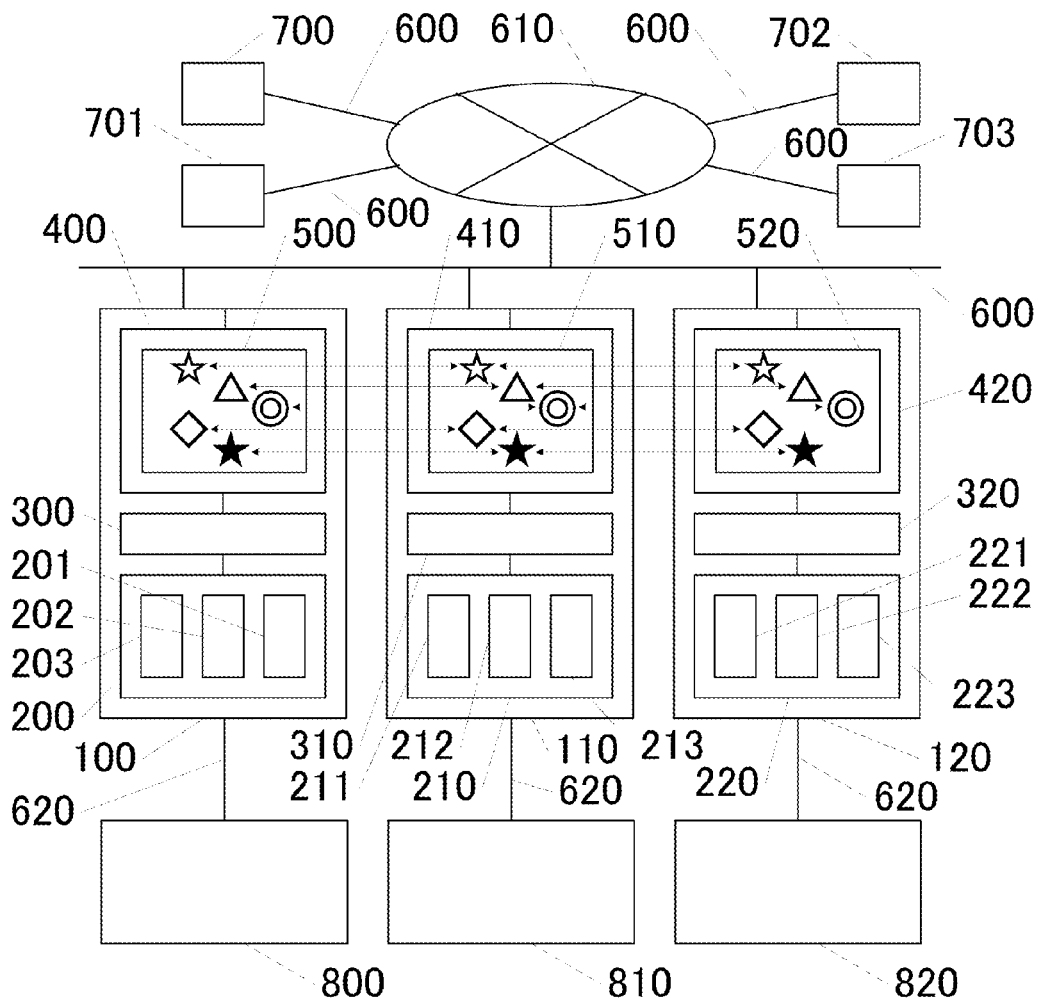
FIG. 1 is a component chart showing the structure of the distributed database system described in Patent Reference Document 1.
Figure 2:
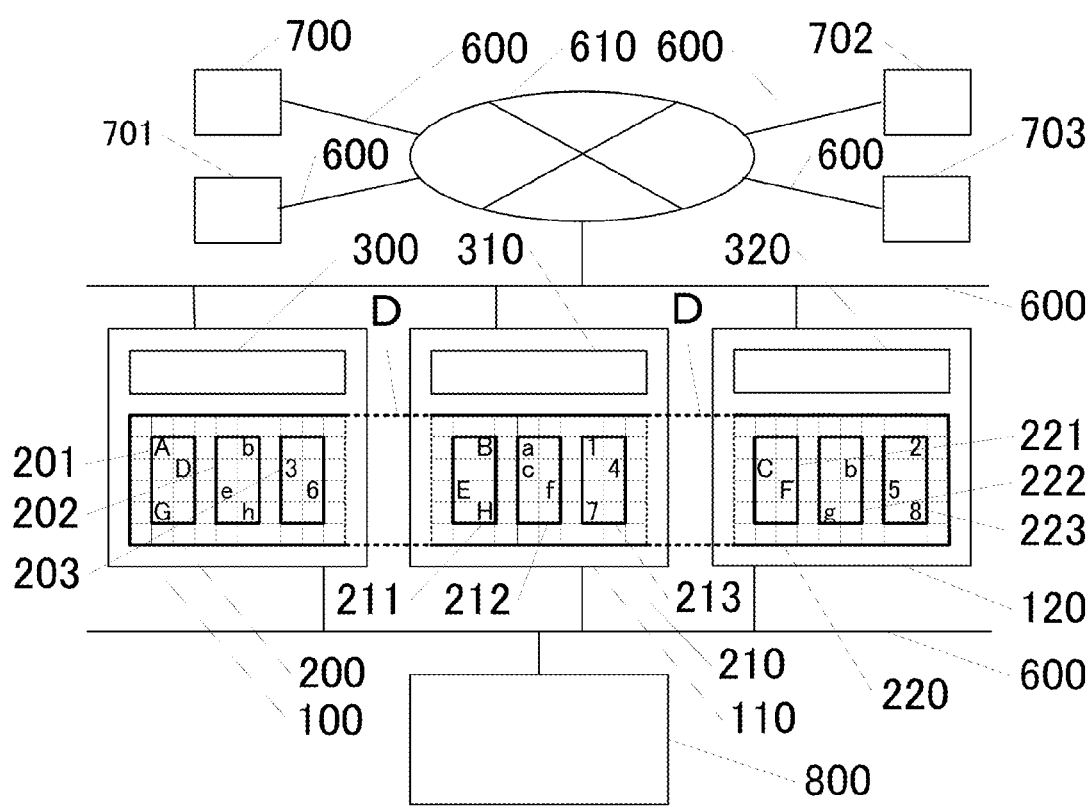
FIG. 2 is a component chart showing the structure of the virtual single database system of the virtual single main memory apparatus storage that can be constructed from techniques described in Non-Patent Reference Document 1.
Figure 3:
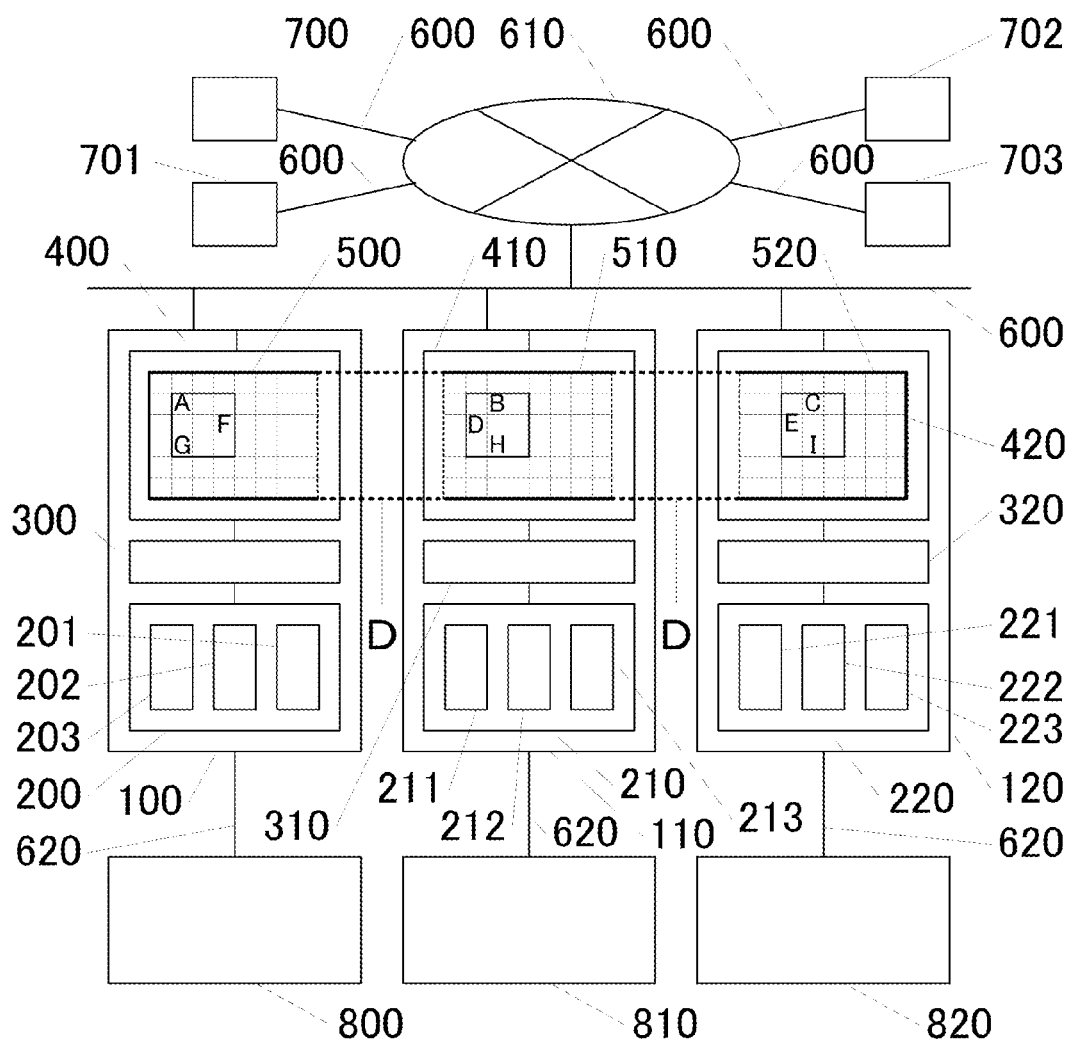
FIG. 3 is a component chart showing the structure of the distributed database system described in Claim 1 that applies partition topology technology. (Embodiment 1)

Said distributed database system described in Claim 1 that applies partition topology technology is explained using FIG. 3.

the distributed database system with shared meta information characterized in below:
in two or more database domains 100, 110 and 120 located on network 600, said a distributed database system with shared meta information comprising:
database object management apparatuses 300, 310 and 320 managing database;
and database object storage apparatuses 200, 210 and 220 corresponding to each said database object management apparatus in order to store databases managed by said database object management apparatuses;

and database meta information management repository apparatuses 400, 410 and 420 in order to keep integrity with external other database domains by meta information held by said databases;

said database meta information management repository apparatuses, herein there are database domains which can communicate with each other on network, and herein database objects are identified:

by the database object identifier linked to the database object management apparatus identifier that is information to identify said database object management apparatus managing database object/objects concerned, and by the database domain identifier to identify said database domain that manages database object management apparatus/apparatuses concerned;

storing as database meta information of the distributed database system:

the data dictionary information defining the structure of the database saved and maintained by the database object management apparatus within its own database domain;

and status information concerning both database object in reference state and database object in referenced state, when database objects within each database object management apparatus within its own database domain are in foreign reference state concerning database objects managed by database object management apparatuses within other said database domains;

and status information on said database objects in shared lock status while said database objects managed by said database object management apparatuses within its own said database domain is in read state from client computers or server computers that directly or indirectly access said database meta information management repository apparatuses managing other said database domains;

and status information on said database objects in exclusive lock status while said database object/objects managed by said database object management apparatuses within its own said database domain is write state from client computers, or server computers that directly or indirectly access said database meta information management repository apparatuses managing other said database domains;

and having:

database meta information storage management portion 500, 510 and 520 which updates and maintains status information about said database objects rapidly, when processing proceeds inside its own database domain and events causing change status information about said database objects occur;

and memory caches comprise:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes shared mutually between nodes as a memory image, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

Embodiment 2

Figure 4:
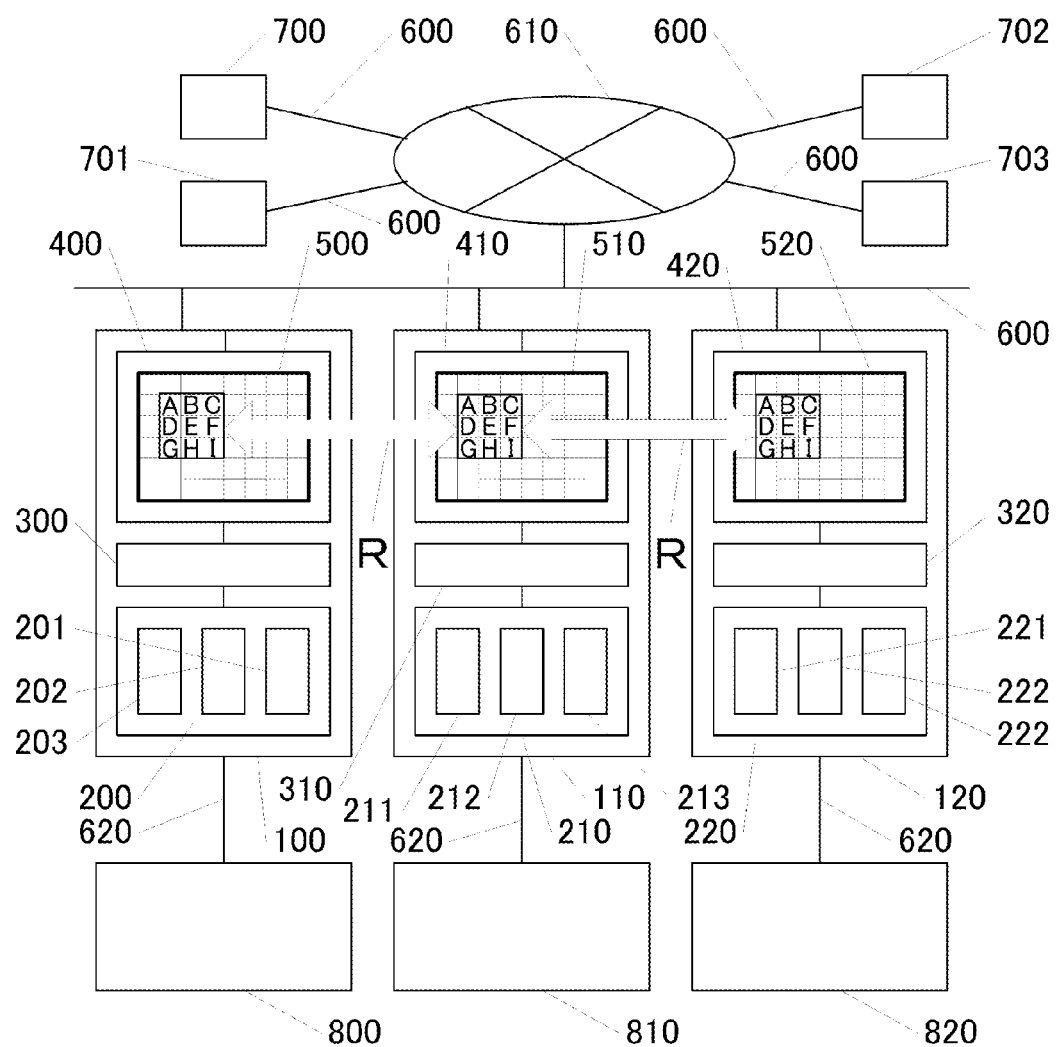
FIG. 4 is a component chart showing the structure of the distributed database system described in Claim 1 that applies replication technology system. (Embodiment 2)

Using FIG. 4, said distributed database system described in Claim 1 applying the partition topology system is explained.

the distributed database system with shared meta information characterized in below:

in two or more database domains 100, 110 and 120 located on network 600, said a distributed database system with shared meta information comprising:

database object management apparatuses 300, 310 and 320 managing database;

and database object storage apparatuses 200, 210 and 220 corresponding to each said database object management apparatus in order to store databases managed by said database object management apparatus/apparatuses;

and database meta information management repository apparatuses 400, 410 and 420 in order to keep integrity with external other database domains by meta information held by said databases;

said database meta information management repository apparatuses, herein there are database domains which can communicate with each other on network, and herein database objects are identified:

by the database object identifier linked to the database object management apparatus identifier that is information to identify said database object management apparatus managing database object/objects concerned, and by the database domain identifier to identify said database domain that manages database object management apparatus/apparatuses concerned;

storing as database meta information of the distributed database system:

the data dictionary information defining the structure of the database saved and maintained by the database object management apparatus within its own database domain;

and status information concerning both database object in reference state and database object in referenced state, when database objects within each database object management apparatus within its own database domain are in foreign reference state concerning database objects managed by database object management apparatuses within other said database domains;

and status information on said database objects in shared lock status while said database objects managed by said database object management apparatuses within its own said database domain is in read state from client computers or server computers that directly or indirectly access said database meta information management repository apparatuses managing other said database domains;

and status information on said database objects in exclusive lock status while said database object/objects managed by said database object management apparatuses within its own said database domain is write state from client computers, or server computers that directly or indirectly access said database meta information management repository apparatuses managing other said database domains;

and having:

database meta information storage management portion 500, 510 and 520 which updates and maintains status information about said database objects rapidly, when processing proceeds inside its own database domain and events causing change status information about said database objects occur;

and memory caches comprise:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes replicated mutually between nodes as a memory image, and held, and accompanying changes in data base meta information, memory image of said memory cache concerning said change on said node concerning said change is synchronized by replication on memory cache corresponding on another node, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

Embodiment 3

Figure 5:
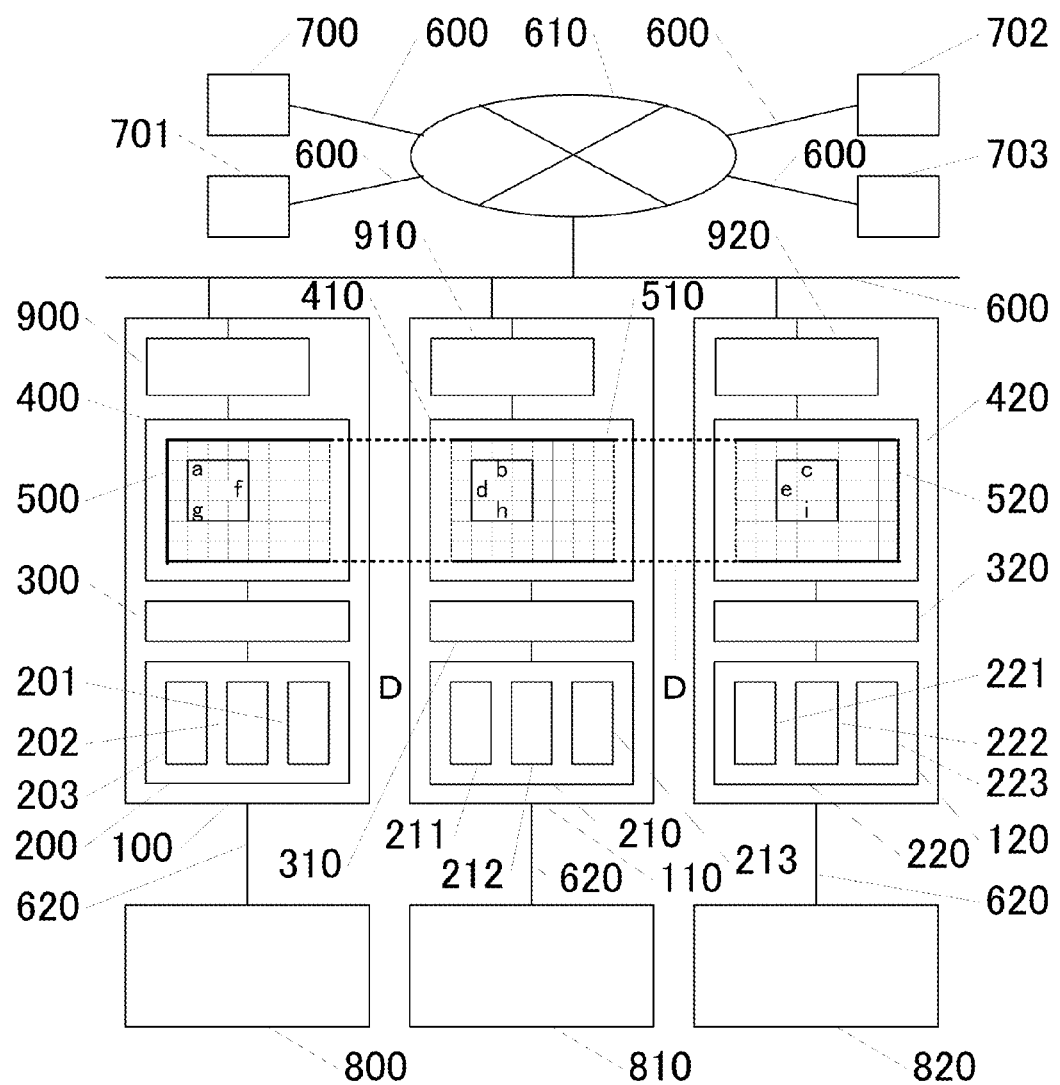
FIG. 5 is a component chart showing the structure of the partition topology technology described in Claim 3. (Embodiment 3)
Figure 19:
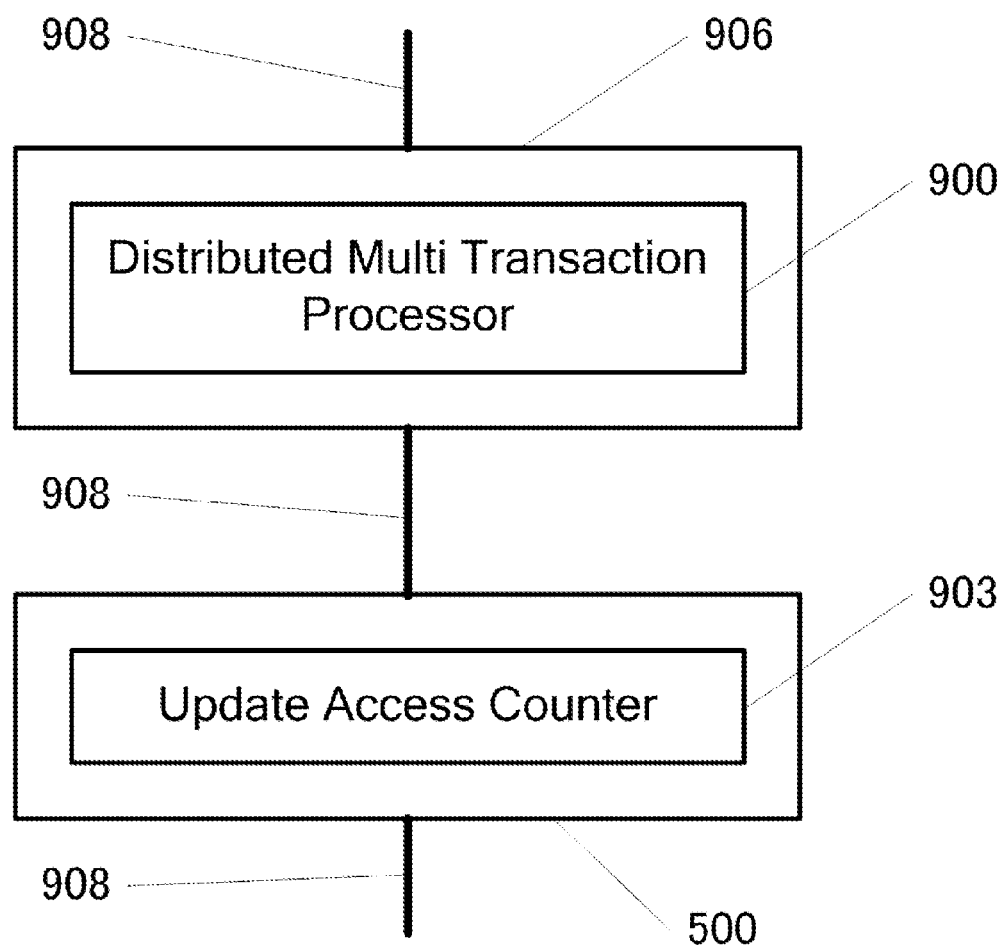
FIG. 19 is a component detail chart for distributed multi transaction process apparatus and database meta information repository management apparatus described in Claim 2.
Figure 20:
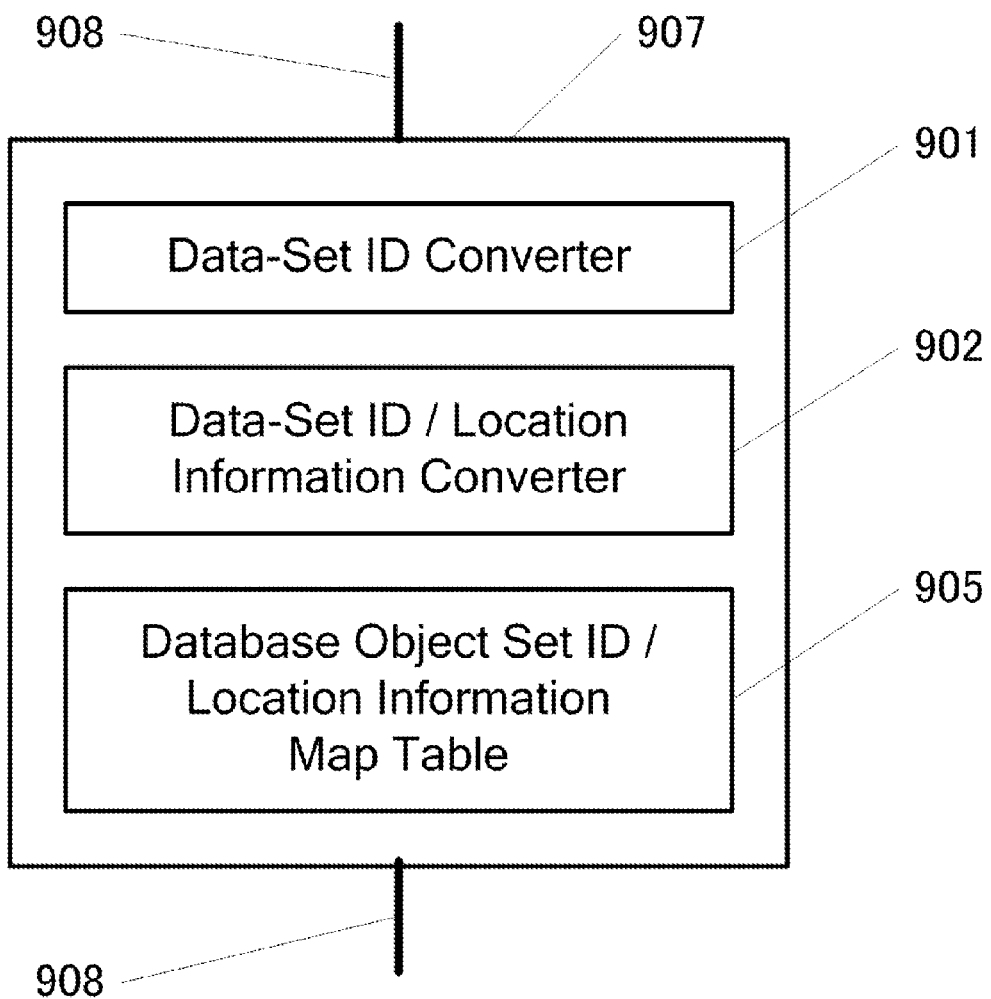
FIG. 20 is a detailed component chart for a database object management apparatus specific apparatus described in Claim 5.

Using FIG. 5 and FIG. 19, said distributed database system described in Claim 3 applying the replication topology system is explained.

the distributed database system with shared meta information characterized in below:

in two or more database domains 100, 110 and 120 located on network 600, said a distributed database system with shared meta information comprising:

one, or two or more database object management apparatuses 300, 310 and 320 managing databases;

and one, or two or more database object storage apparatuses 200, 210 and 220 corresponding to each said database object management apparatuses in order to store databases managed by said database object management apparatuses;

and distributed multi transaction processing apparatuses 900, 910 and 920 for implementing and maintaining transaction consistency in distributed multi transaction processing;

and one, or two or more database meta information management repository apparatuses 400, 410 and 420 in order to keep integrity with external other database domains by meta information held by said databases;

said distributed multi transaction processing apparatuses have distributed multi transaction process executing portion 906 characterized in below:

herein there are two or more database domains which can communicate with each other on network, and herein database objects are identified by:
the database object identifier linked to the database object management apparatus identifier that is information to identify said database object management apparatus managing database objects concerned;

and the database domain identifier to identify said database domain that manages database object management apparatuses concerned;

in transaction processing for database objects which are requested from client computers or server computers to access as update processes such as insertion or modification or deletion directly or indirectly, and are managed by database object management apparatuses inside its own or the other said database domains, herein update access counter 903 identified by process identifier to identify the process which is the starting point of one, or two or more update accesses requested from database domains, exists, herein said update access counter has initial value specified beforehand, the count in said update access counter which is identified by process identifier which identifies the process which is the starting point of said update accesses concerned is counted up by the constant number each time when update accesses are occurred requested by the processes or threads on the client computers or server computers inside their own or the other said database domains if said processes or threads which are caused by the starting process itself or processes which are caused by the starting process directly or indirectly, exists;

and the count in said update access counter which is identified by process identifier which identifies the process which is the starting point of said update accesses concerned is counted down by the constant number same as said constant number concerned each time when the information that actual update access succeeded reach to said distributed multi transaction processing apparatuses;

and when the value of said counter concerned matches said initial value concerned, commit operations are executed for all update accesses executed by the processes or threads which are caused by the starting process itself or processes which are caused by the starting process directly or indirectly on the client computers or server computers inside their own or other database domains directly or indirectly;

and in case of that the information that actual update access failed reach to said distributed multi transaction processing apparatus, further update accesses are stopped, and without waiting for the results, rollback operations for all update accesses executed already by the processes or threads which are caused directly or indirectly by the starting process itself or processes or threads if exist on the client computers or server computers inside their own or other database domains are executed promptly, said database meta information management repository apparatuses having:

herein there are two or more database domains which can communicate with each other on network, update access counter identified by the process identifier which identifies the process which is the starting point of said update accesses requested by a plurality of database domains;

and memory caches comprises:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes shared mutually between nodes as a memory image, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

Figure 17:
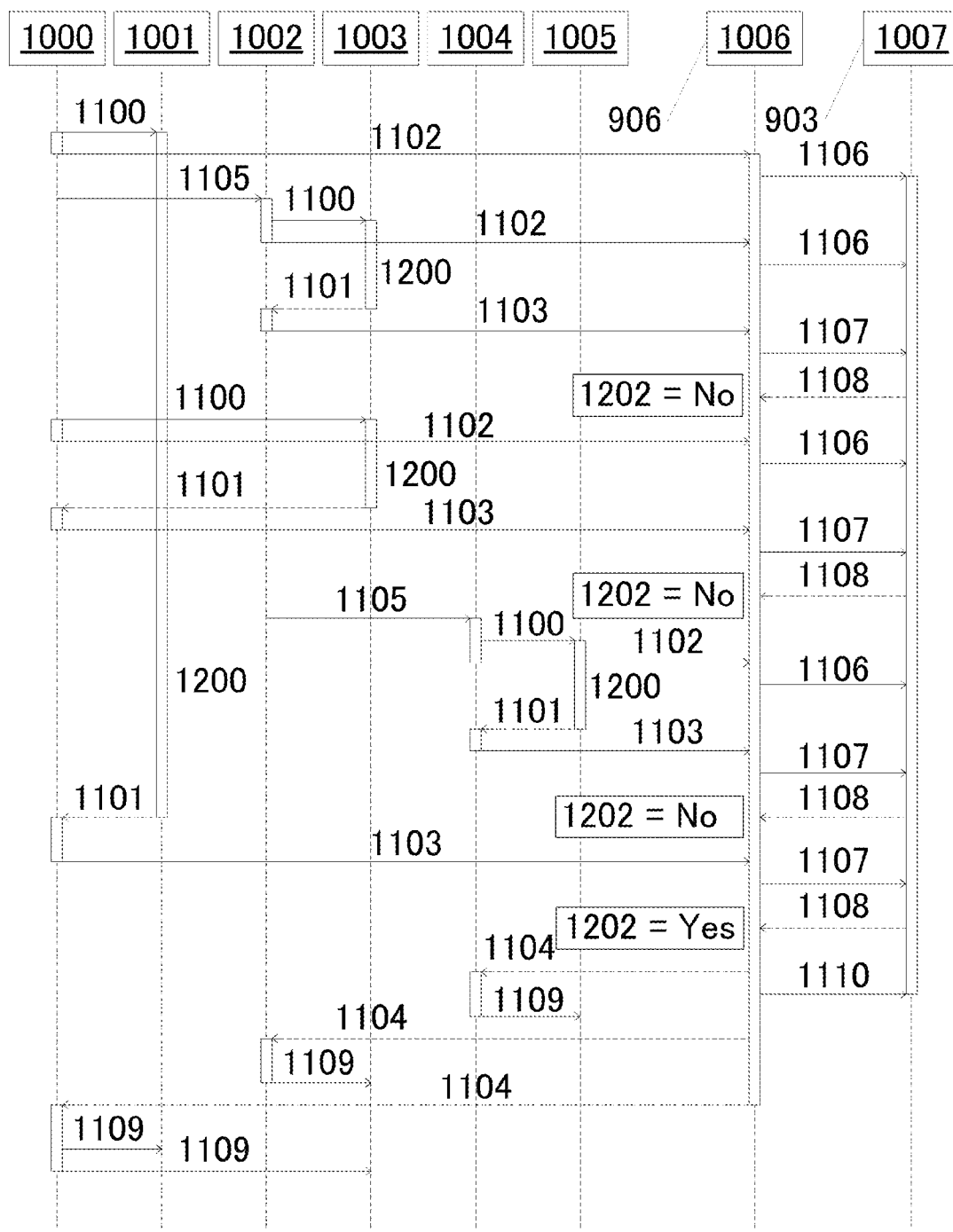
FIG. 17 is a sequence chart showing where all update operations are successful in a multi transaction process using the shared counter method described in Claim 2.

FIG. 17 is a sequence chart showing all update operations succeeding in multi transaction process by shared counter method.

Figure 18:
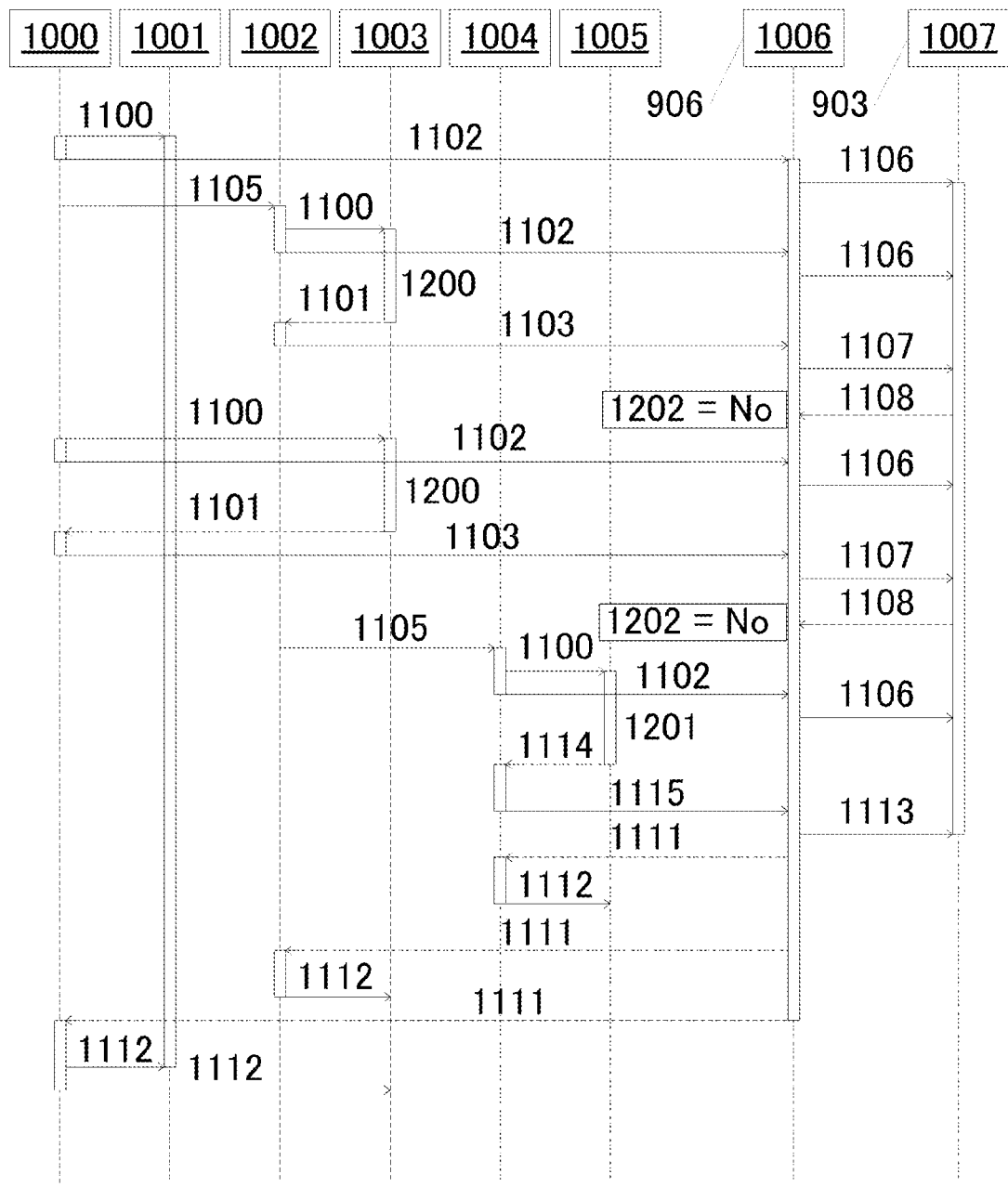
FIG. 18 is a sequence chart where the update operation fails partway in a multi transaction process using the shared counter method described in Claim 2.

FIG. 18 is a sequence chart showing update operation failure part way in multi transaction process by shared counter method.

Embodiment 4

Figure 6:
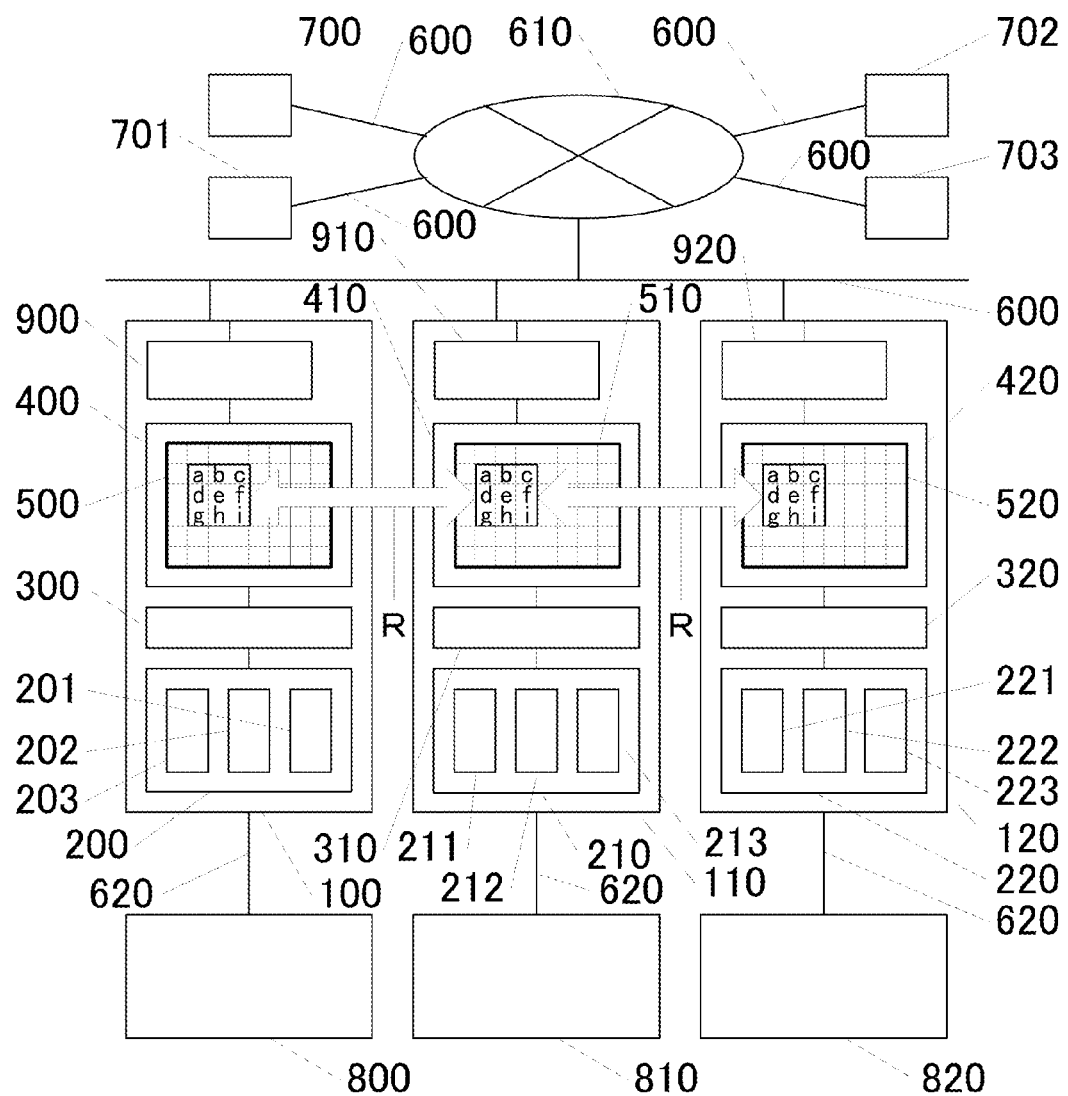
FIG. 6 is a component chart showing the structure of the distributed database system described in Claim 3 that applies replication technology system. (Embodiment 4)

Using FIG. 6 and FIG. 19, said distributed database system described in Claim 3 applying the replication topology system is explained.

the distributed database system with shared meta information characterized in below:

in two or more database domains 100, 110 and 120 located on network 600, said a distributed database system with shared meta information comprising:

one, or two or more database object management apparatuses 300, 310 and 320 managing databases;

and one, or two or more database object storage apparatuses 200, 210 and 220 corresponding to each said database object management apparatuses in order to store databases managed by said database object management apparatuses;

and distributed multi transaction processing apparatuses 900, 910 and 920 for implementing and maintaining transaction consistency in distributed multi transaction processing;

and one, or two or more database meta information management repository apparatuses 400, 410 and 420 in order to keep integrity with external other database domains by meta information held by said databases;

said distributed multi transaction processing apparatuses have distributed multi transaction process executing portion 906 characterized in below:

herein there are two or more database domains which can communicate with each other on network, and herein database objects are identified by:

the database object identifier linked to the database object management apparatus identifier that is information to identify said database object management apparatus managing database objects concerned;

and the database domain identifier to identify said database domain that manages database object management apparatuses concerned;

in transaction processing for database objects which are requested from client computers or server computers to access as update processes such as insertion or modification or deletion directly or indirectly, and are managed by database object management apparatuses inside its own or the other said database domains, herein update access counter 903 identified by process identifier to identify the process which is the starting point of one, or two or more update accesses requested from database domains, exists, herein said update access counter has initial value specified beforehand, the count in said update access counter which is identified by process identifier which identifies the process which is the starting point of said update accesses concerned is counted up by the constant number each time when update accesses are occurred requested by the processes or threads on the client computers or server computers inside their own or the other said database domains if said processes or threads which are caused by the starting process itself or processes which are caused by the starting process directly or indirectly, exists;

and the count in said update access counter which is identified by process identifier which identifies the process which is the starting point of said update accesses concerned is counted down by the constant number same as said constant number concerned each time when the information that actual update access succeeded reach to said distributed multi transaction processing apparatuses;

and when the value of said counter concerned matches said initial value concerned, commit operations are executed for all update accesses executed by the processes or threads which are caused by the starting process itself or processes which are caused by the starting process directly or indirectly on the client computers or server computers inside their own or other database domains directly or indirectly;

and in case of that the information that actual update access failed reach to said distributed multi transaction processing apparatus, further update accesses are stopped, and without waiting for the results, rollback operations for all update accesses executed already by the processes or threads which are caused directly or indirectly by the starting process itself or processes or threads if exist on the client computers or server computers inside their own or other database domains are executed promptly, said database meta information management repository apparatuses having:

herein there are two or more database domains which can communicate with each other on network, update access counter identified by the process identifier which identifies the process which is the starting point of said update accesses requested by a plurality of database domains;

and memory caches comprises:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes replicated mutually between nodes as a memory image, and held, and accompanying changes in database meta information, memory image of said memory cache concerning said change on said node concerning said change is synchronized by replication on memory cache corresponding on another node, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

FIG. 17 is a sequence chart showing all update operations succeeding in multi transaction process by shared counter method.

FIG. 18 is a sequence chart showing update operation failure part way in multi transaction process by shared counter method.

Embodiment 5

Figure 7:
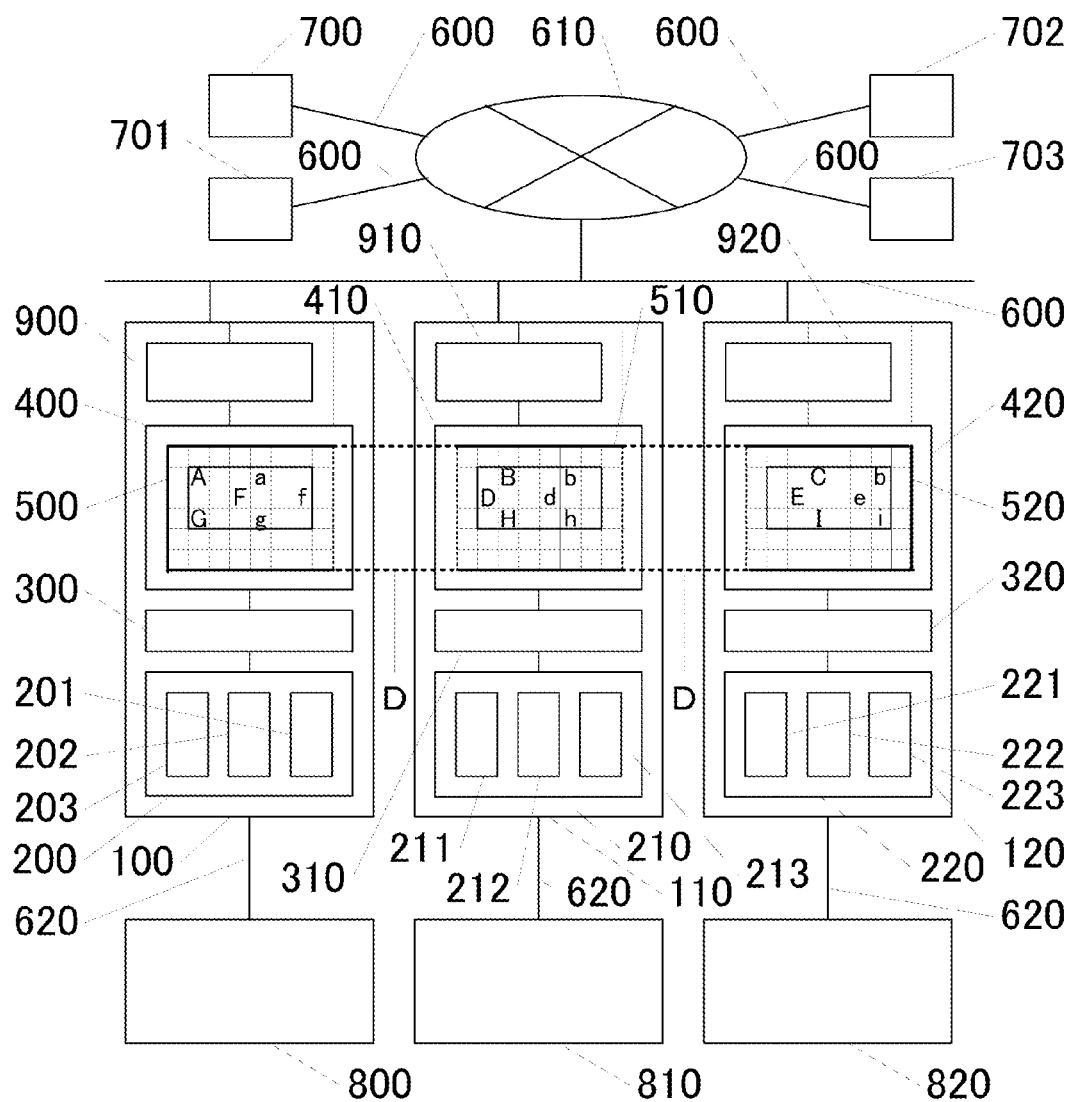
FIG. 7 is a component chart showing the structure of the distributed database system described in Claim 4 that applies partition topology technology. (Embodiment 5)

Using FIG. 7 and FIG. 19, said distributed database system described in Claim 4 applying the partition topology system is explained.

the distributed database system with shared meta information according to Embodiment 1, and further characterized in below:

in database domains located on network, said a distributed database system with shared meta information further comprising:

and distributed multi transaction processing apparatuses 900, 910 and 920 for implementing and maintaining transaction consistency in distributed multi transaction processing;

said distributed multi transaction processing apparatuses have distributed multi transaction process executing portion 906 characterized in below:

herein there are database domains 100, 110 and 120 which can communicate with each other on networks, and herein database objects are identified by:

the database object identifier linked to the database object management apparatus 300, 310 and 320 identifier that is information to identify said database object management apparatus managing database objects concerned;

and the database domain identifier to identify said database domain that manages database object management apparatuses concerned;

in transaction processing for database objects which are requested from client computers or server computers to access as update processes such as insertion or modification or deletion directly or indirectly, and are managed by database object management apparatuses inside its own or the other said database domains, herein update access counter 903 identified by process identifier to identify the process which is the starting point of one, or two or more update accesses requested from two or more database domains, exists, herein said update access counter has initial value specified beforehand, the count in said update access counter which is identified by process identifier which identifies the process which is the starting point of said update accesses concerned is counted up by the constant number each time when update accesses are occurred requested by the processes or threads on the client computers or server computers inside their own or the other said database domains if said processes or threads which are caused by the starting process itself or process/processes which are caused by the starting process directly or indirectly, exists;

and the count in said update access counter which is identified by process identifier which identifies the process which is the starting point of said update accesses concerned is counted down by the constant number same as said constant number concerned each time when the information that actual update access succeeded reach to said distributed multi transaction processing apparatuses;

and when the value of said counter concerned matches said initial value concerned, commit operations are executed for all update accesses executed by the processes or threads which are caused by the starting process itself or processes which are caused by the starting process directly or indirectly on the client computers or server computers inside their own or other database domains directly or indirectly;

and in case of that the information that actual update access failed reach to said distributed multi transaction processing apparatuses, further update accesses are stopped, and without waiting for the result/results, rollback operations for all update accesses executed already by the processes or threads which are caused directly or indirectly by the starting process itself or processes or threads if exist on the client computers or server computers inside their own or other database domains are executed promptly, said database meta information management repository apparatuses 400, 410 and 420 having:

herein there are two or more database domains which can communicate with each other on network, update access counter/counters identified by the process identifier which identifies the process which is the starting point of one, or two or more said update access/accesses requested by a plurality of database domains;

FIG. 17 is a sequence chart showing all update operations succeeding in multi transaction process by shared counter method.

FIG. 18 is a sequence chart showing update operation failure part way in multi transaction process by shared counter method.

Embodiment 6

Figure 8:
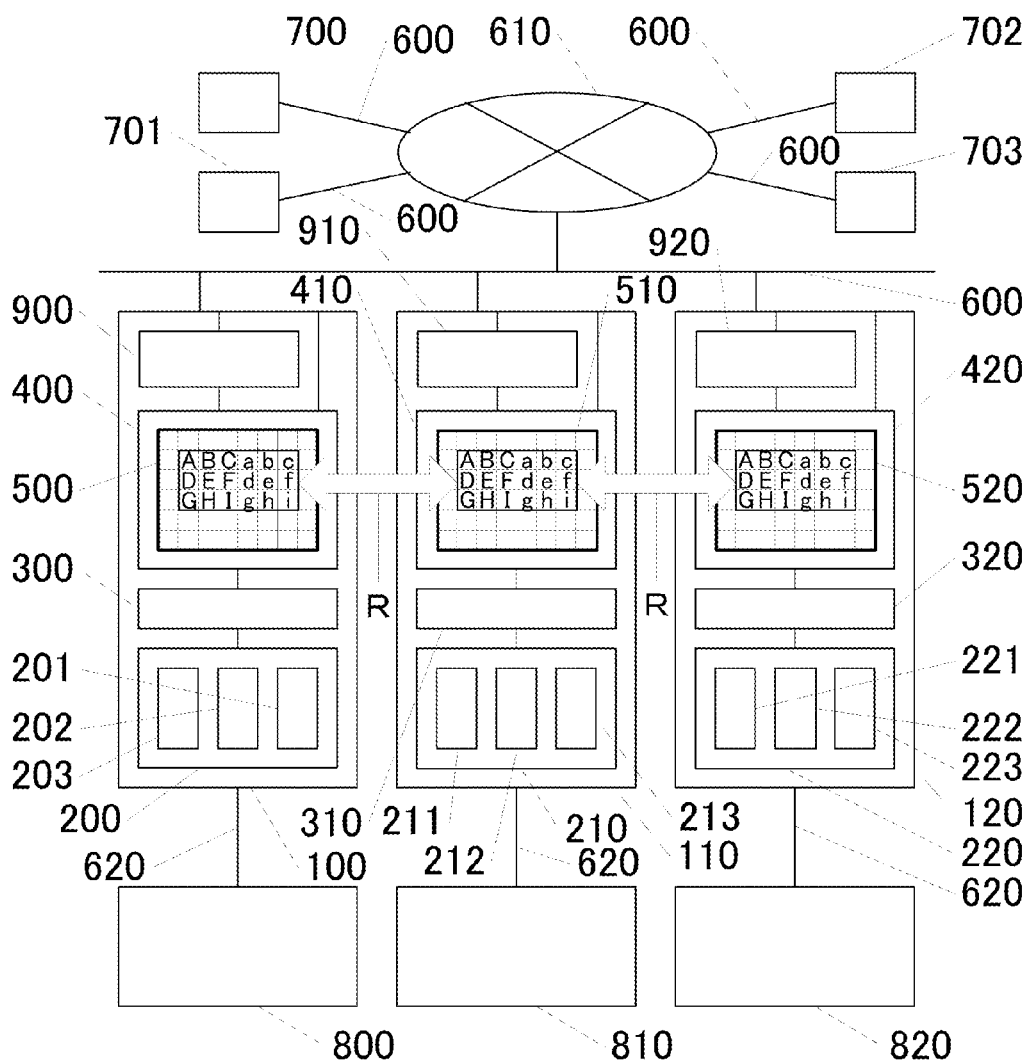
FIG. 8 is a component chart showing the structure of the distributed database system described in Claim 4 that applies replication technology system. (Embodiment 6)

Using FIG. 8 and FIG. 19, said distributed database system described in Claim 4 applying the replication topology system is explained.

the distributed database system with shared meta information according to Embodiment 2, and further characterized in below:

in database domains located on network, said a distributed database system with shared meta information further comprising:

and distributed multi transaction processing apparatuses 900, 910 and 920 for implementing and maintaining transaction consistency in distributed multi transaction processing;

said distributed multi transaction processing apparatuses have distributed multi transaction process executing portion 906 characterized in below:

herein there are database domains 100, 110 and 120 which can communicate with each other on networks, and herein database objects are identified by:

the database object identifier linked to the database object management apparatus 300, 310 and 320 identifier that is information to identify said database object management apparatus managing database objects concerned;

and the database domain identifier to identify said database domain that manages database object management apparatuses concerned;

in transaction processing for database objects which are requested from client computers or server computers to access as update processes such as insertion or modification or deletion directly or indirectly, and are managed by database object management apparatuses inside its own or the other said database domains, herein update access counter 903 identified by process identifier to identify the process which is the starting point of one, or two or more update accesses requested from two or more database domains, exists, herein said update access counter has initial value specified beforehand, the count in said update access counter which is identified by process identifier which identifies the process which is the starting point of said update accesses concerned is counted up by the constant number each time when update accesses are occurred requested by the processes or threads on the client computers or server computers inside their own or the other said database domains if said processes or threads which are caused by the starting process itself or process/processes which are caused by the starting process directly or indirectly, exists;

and the count in said update access counter which is identified by process identifier which identifies the process which is the starting point of said update accesses concerned is counted down by the constant number same as said constant number concerned each time when the information that actual update access succeeded reach to said distributed multi transaction processing apparatuses;

and when the value of said counter concerned matches said initial value concerned, commit operations are executed for all update accesses executed by the processes or threads which are caused by the starting process itself or processes which are caused by the starting process directly or indirectly on the client computers or server computers inside their own or other database domains directly or indirectly;

and in case of that the information that actual update access failed reach to said distributed multi transaction processing apparatuses, further update accesses are stopped, and without waiting for the result/results, rollback operations for all update accesses executed already by the processes or threads which are caused directly or indirectly by the starting process itself or processes or threads if exist on the client computers or server computers inside their own or other database domains are executed promptly, said database meta information management repository apparatuses 400, 410 and 420 having:

herein there are two or more database domains which can communicate with each other on network, update access counter/counters identified by the process identifier which identifies the process which is the starting point of one, or two or more said update access/accesses requested by a plurality of database domains;

FIG. 17 is a sequence chart showing all update operations succeeding in multi transaction process by shared counter method.

FIG. 18 is a sequence chart showing update operation failure part way in multi transaction process by shared counter method.

Embodiment 7

Figure 9:
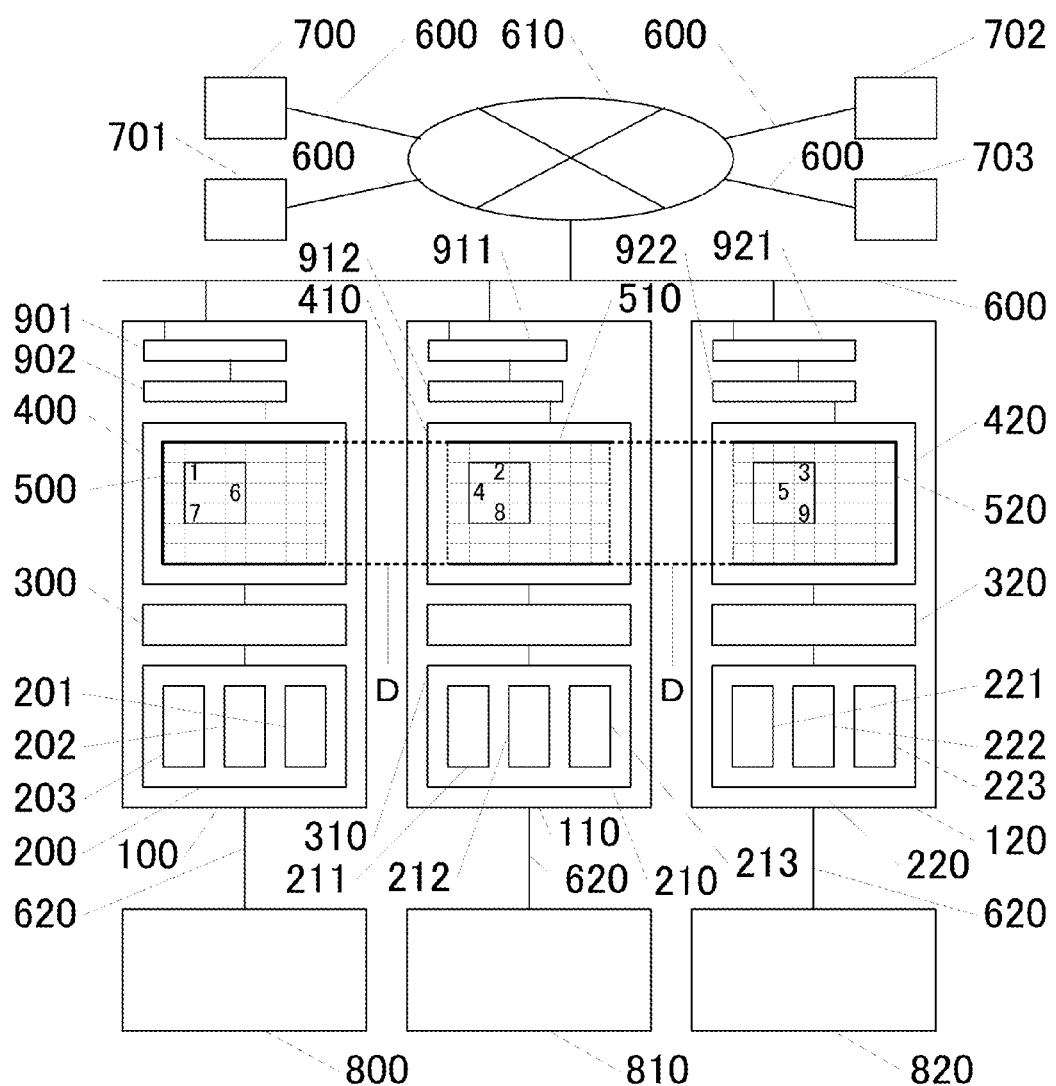
FIG. 9 is a component chart showing the structure of the distributed database system described in Claim 5 that applies partition topology technology. (Embodiment 7)
Figure 21:
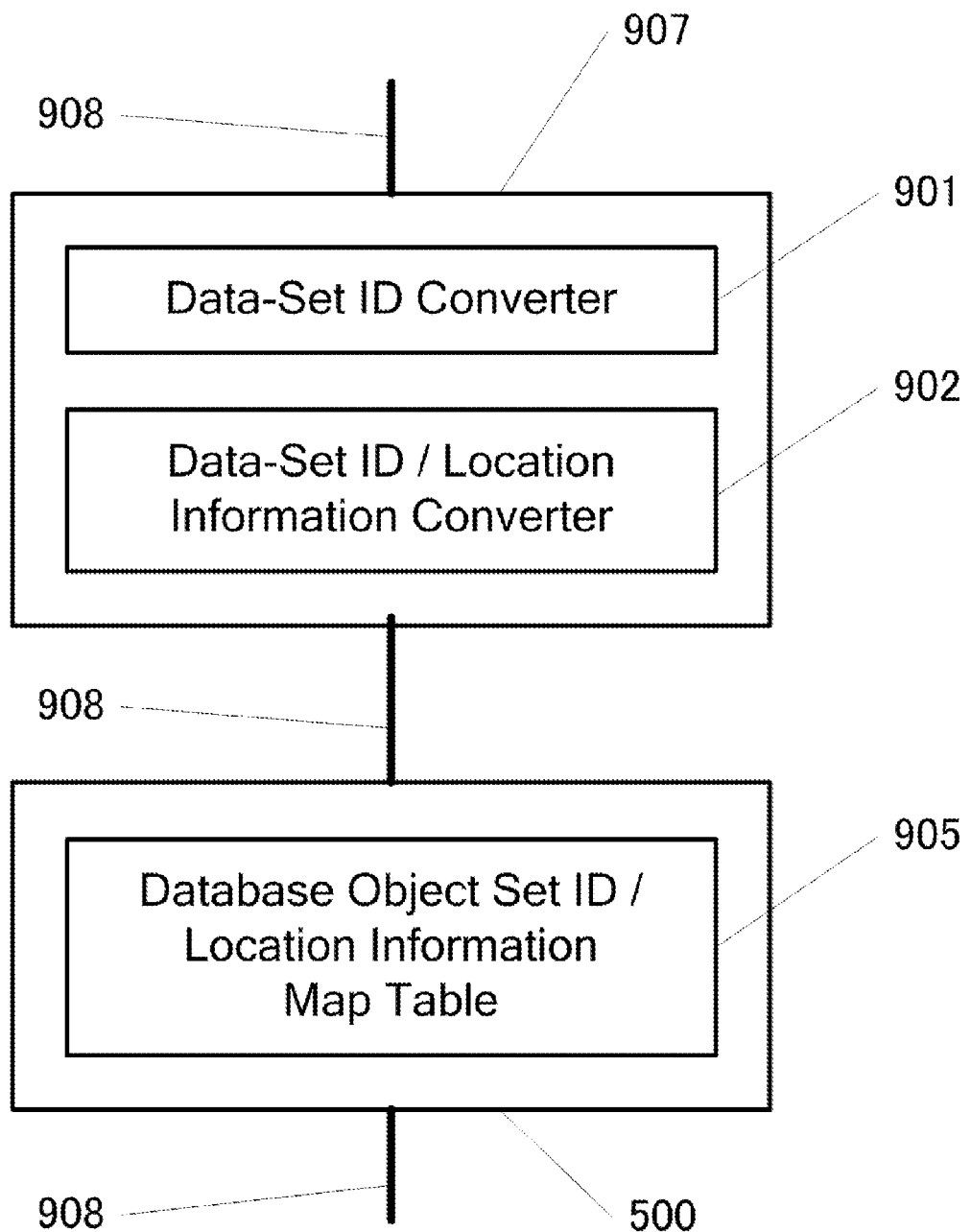
FIG. 21 is a detailed component chart for a database object management apparatus specific apparatus and database meta information repository management apparatus described in Claim 5.
Figure 22:
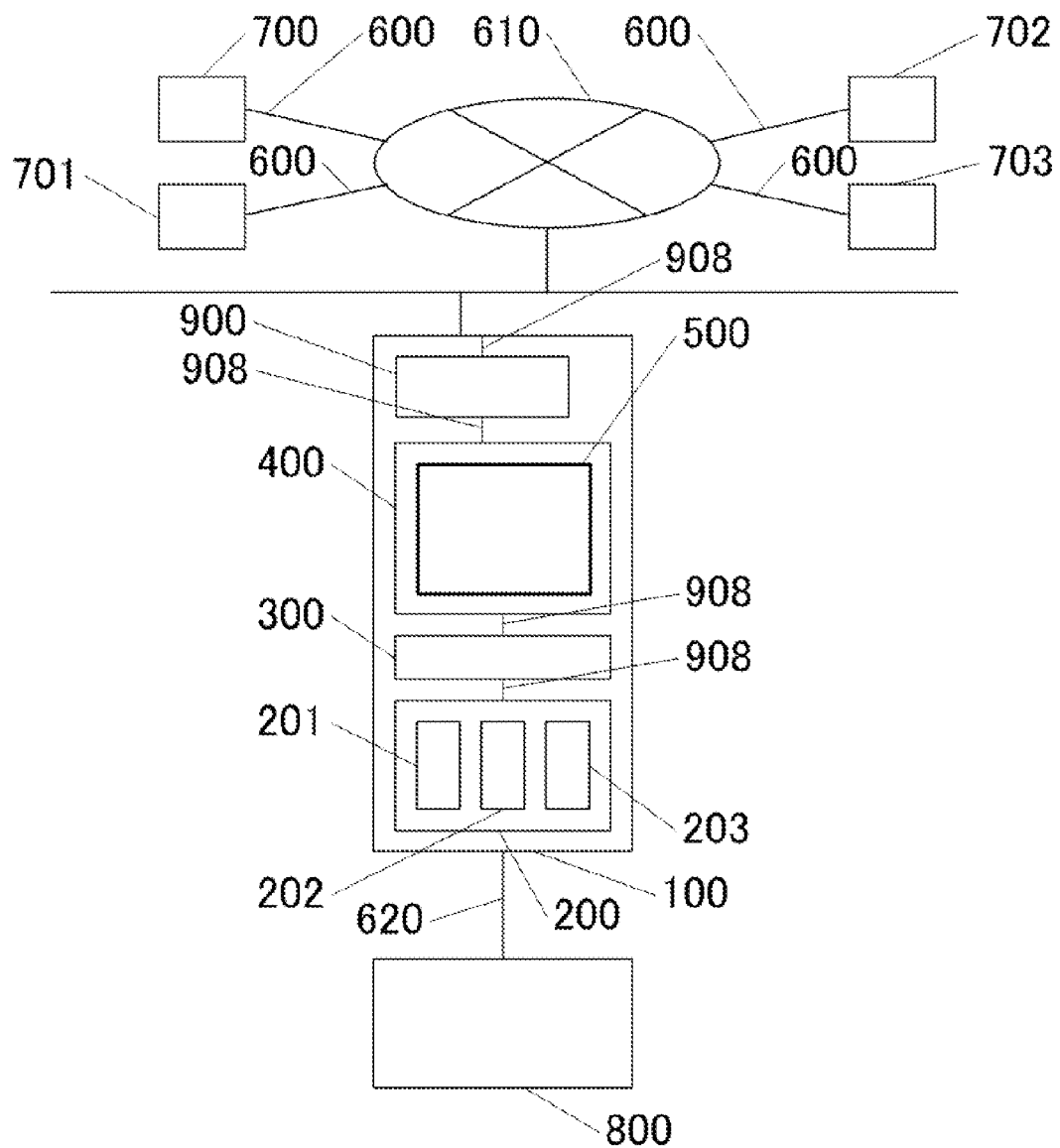
FIG. 22 is a component chart showing the structure of the distributed multi transaction processing apparatus described in Claim 2 that applies shared counter method. (Embodiment 19)

Using FIG. 9 and FIG. 21, said distributed database system described in Claim 5 applying the partition topology system is explained.

the distributed database system with shared meta information characterized in below:

in database domains 100, 110 and 120 located on the network, said a distributed database system with shared meta information comprising:

database object management apparatuses managing databases;

and database object storage apparatuses 200, 210 and 220 corresponding to each said database object management apparatuses in order to store databases managed by said database object management apparatuses;

and database object management apparatus specific apparatus 907 to associate the target data object with the data object management apparatus, in order to store tuples into one, two or more database object storage apparatuses managed by database object management apparatuses managed in a plurality of database domains using horizontal partitioning when too many tuples cannot be stored in a single said database object storage apparatus as a single relation;

and processing apparatuses for retrieved database objects in order to search or process or update database objects spread across a plurality of database domains;

and database meta information management repository apparatuses 400, 410 and 420 in order to keep integrity with external other database domains by meta information held by said databases;

said database object management apparatuses specific apparatuses having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatuses where are physical location to store said database object set concerned corresponding to said database object set identifier concerned, and said database object set identifier concerned;

said processing apparatuses for retrieved database objects in order to search or process or update database objects having:

database object set identifier searching portion which searches database object sets across on database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database object/objects concerned and by the database domain identifier to identify said database domain that manages database object management apparatuses concerned, the database object set identifier location information map table 905 which associates database object set location identifier to database object set location information which is held and maintained in said database object set identifier location information converting portion of said database object management apparatus specific apparatus;

and memory caches comprise:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes shared mutually between nodes as a memory image, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

Embodiment 8

Figure 10:
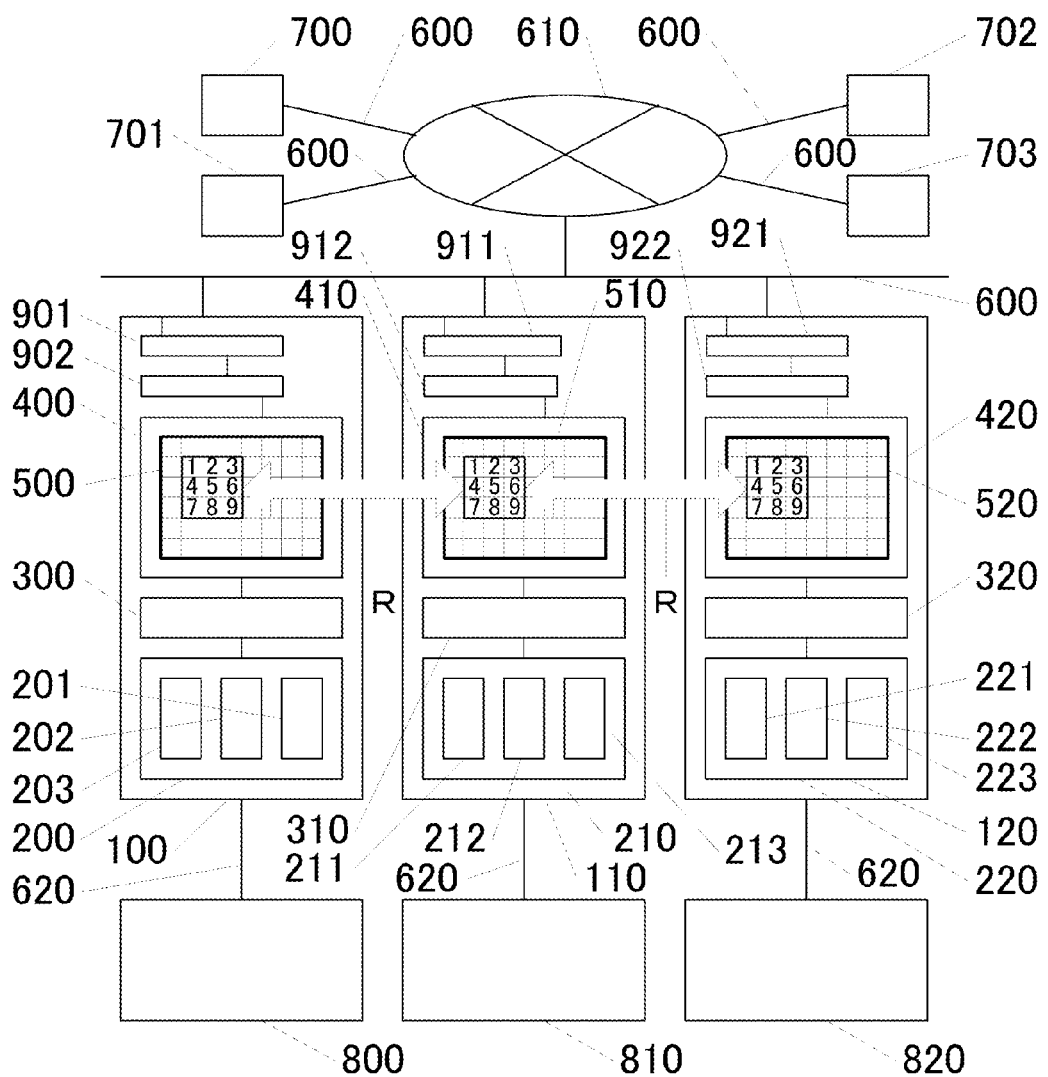
FIG. 10 is a component chart showing the structure of the distributed database system described in Claim 5 that applies replication technology system. (Embodiment 8)

Using FIG. 10 and FIG. 21, said distributed database system described in Claim 5 applying the replication topology system is explained.

the distributed database system with shared meta information characterized in below:

in database domains 100, 110 and 120 located on the network, said a distributed database system with shared meta information comprising:

database object management apparatuses managing databases;

and database object storage apparatuses 200, 210 and 220 corresponding to each said database object management apparatuses in order to store databases managed by said database object management apparatuses;

and database object management apparatus specific apparatus 907 to associate the target data object with the data object management apparatus, in order to store tuples into one, two or more database object storage apparatuses managed by database object management apparatuses managed in a plurality of database domains using horizontal partitioning when too many tuples cannot be stored in a single said database object storage apparatus as a single relation;

and processing apparatuses for retrieved database objects in order to search or process or update database objects spread across a plurality of database domains;

and database meta information management repository apparatuses 400, 410 and 420 in order to keep integrity with external other database domains by meta information held by said databases;

said database object management apparatuses specific apparatuses having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches database object sets across on database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database object/objects concerned and by the database domain identifier to identify said database domain that manages database object management apparatuses concerned, the database object set identifier location information map table 905 which associates database object set location identifier to database object set location information which is held and maintained in said database object set identifier location information converting portion of said database object management apparatus specific apparatus;

and memory caches comprise:

'part of the main memory apparatuses' of each node which is the server computer implemented as said database meta information management repository apparatus 'in the database domain participating in said distributed database';

and a single virtual main memory apparatus comprises said memory caches;

and is realized by said memory caches of their own node and other nodes replicated mutually between nodes as a memory image, and held, and accompanying changes in data base meta information, memory image of said memory cache concerning said change on said node concerning said change is synchronized by replication on memory cache corresponding on another node, and said database meta information storage management portion 500 of its own database meta information management repository apparatus, and said database meta information storage management portion 510 and 520 of said database meta information management repository apparatus inside the other database domain, can be shared with each meta information management repository apparatus said 'in the database domain participating in said distributed database'.

Embodiment 9

Figure 11:
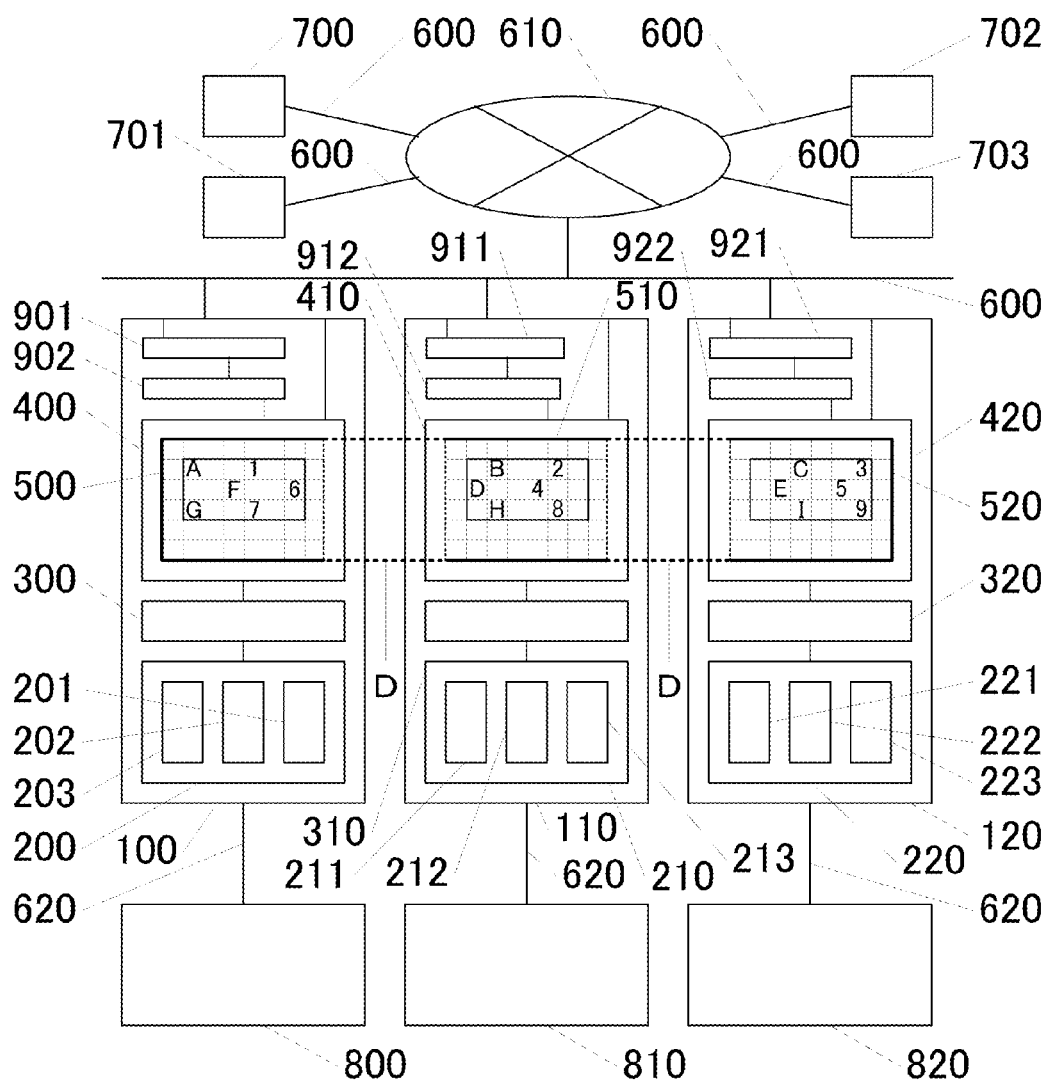
FIG. 11 is a component chart showing the structure of the distributed database system described in Claim 6 that applies partition topology technology. (Embodiment 9)

Using FIG. 11 and FIG. 21, said distributed database system described in Claim 6 applying the partition topology system is explained.

the distributed database system with shared meta information according to Embodiment 1, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

Embodiment 10

Figure 12:
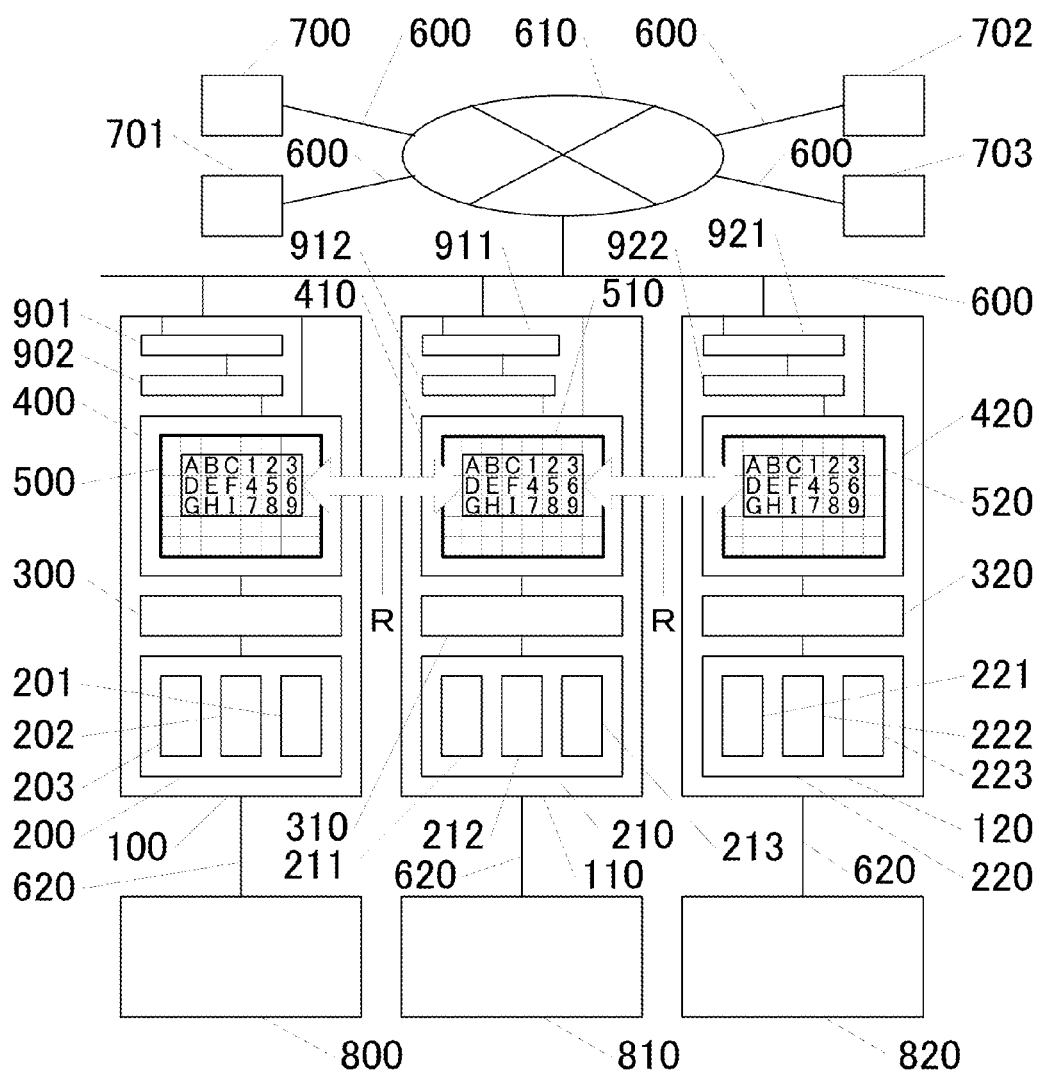
FIG. 12 is a component chart showing the structure of the distributed database system described in Claim 6 that applies replication technology system. (Embodiment 10)

Using FIG. 12 and FIG. 21, said distributed database system described in Claim 6 applying the replication topology system is explained.

the distributed database system with shared meta information according to Embodiment 2, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having;

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having;

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having;

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

Embodiment 11

Figure 13:
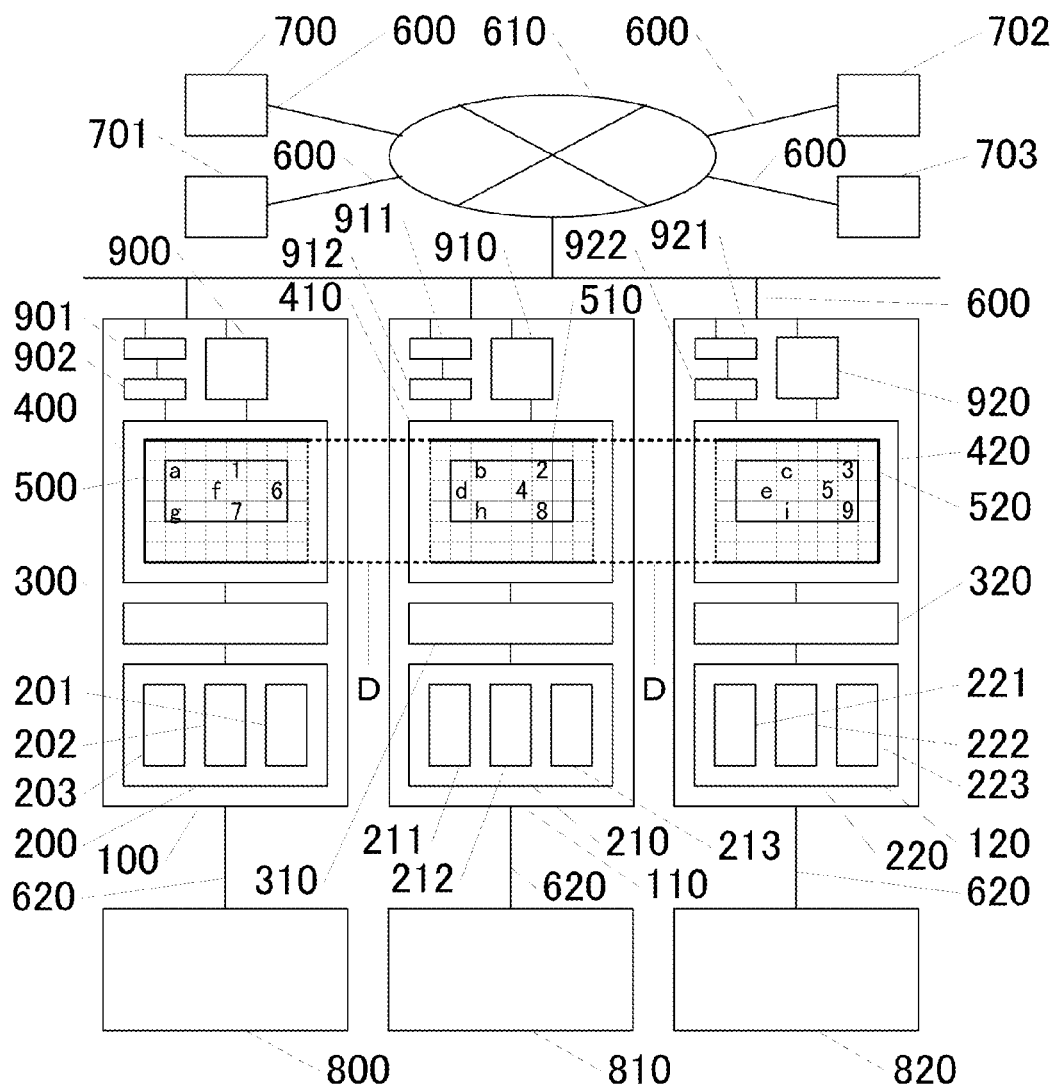
FIG. 13 is a component chart showing the structure of the distributed database system described in Claim 7 that uses partition topology technology. (Embodiment 11)

Using FIG. 13 and FIG. 21, said distributed database system described in Claim 7 applying the partition topology system is explained.

the distributed database system with shared meta information according to Embodiment 3, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

Embodiment 12

Figure 14:
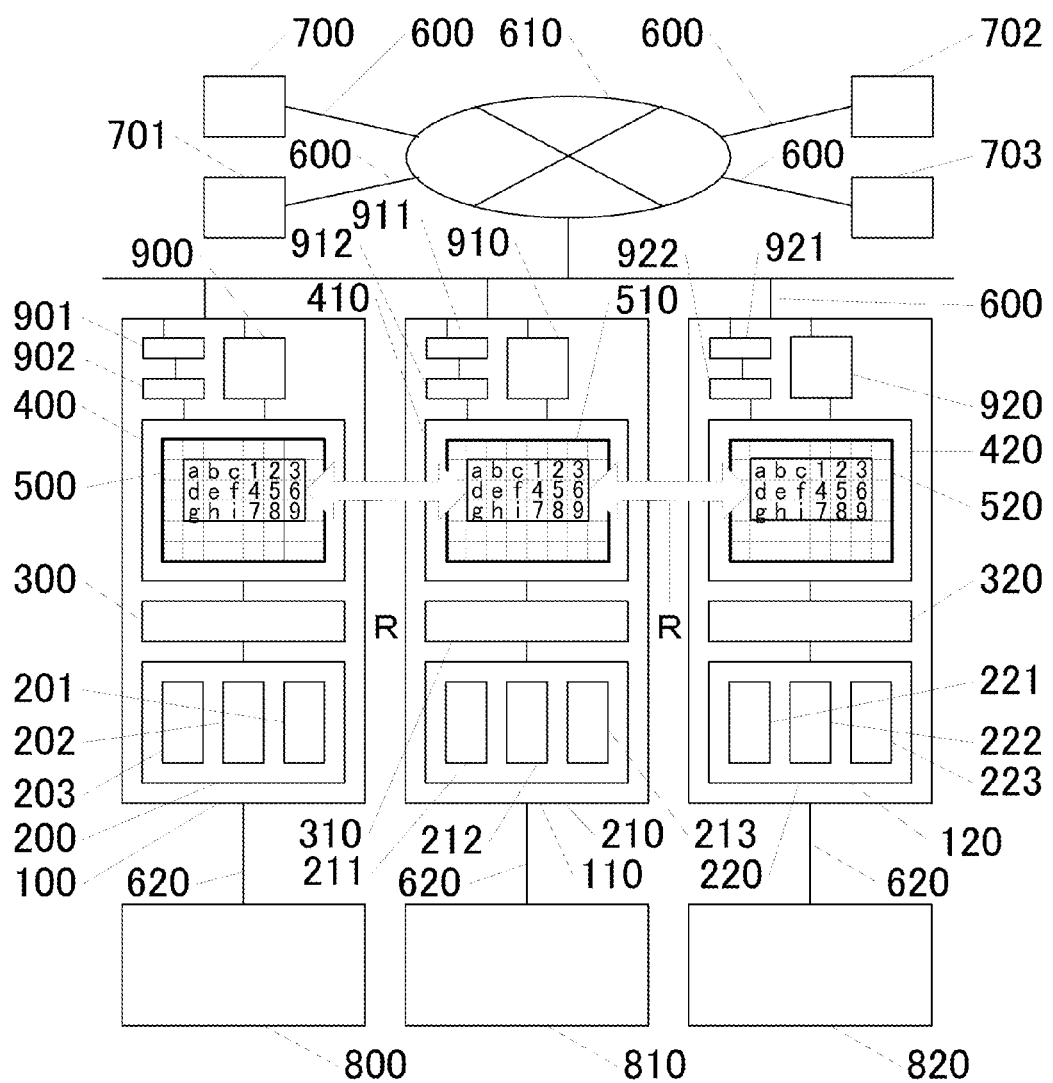
FIG. 14 is a component chart showing the structure of the distributed database system described in Claim 7 that uses replication technology system. (Embodiment 12)

Using FIG. 14 and FIG. 21, said distributed database system described in Claim 7 applying the replication topology system is explained.

the distributed database system with shared meta information according to Embodiment 4, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

Embodiment 13

Figure 15:
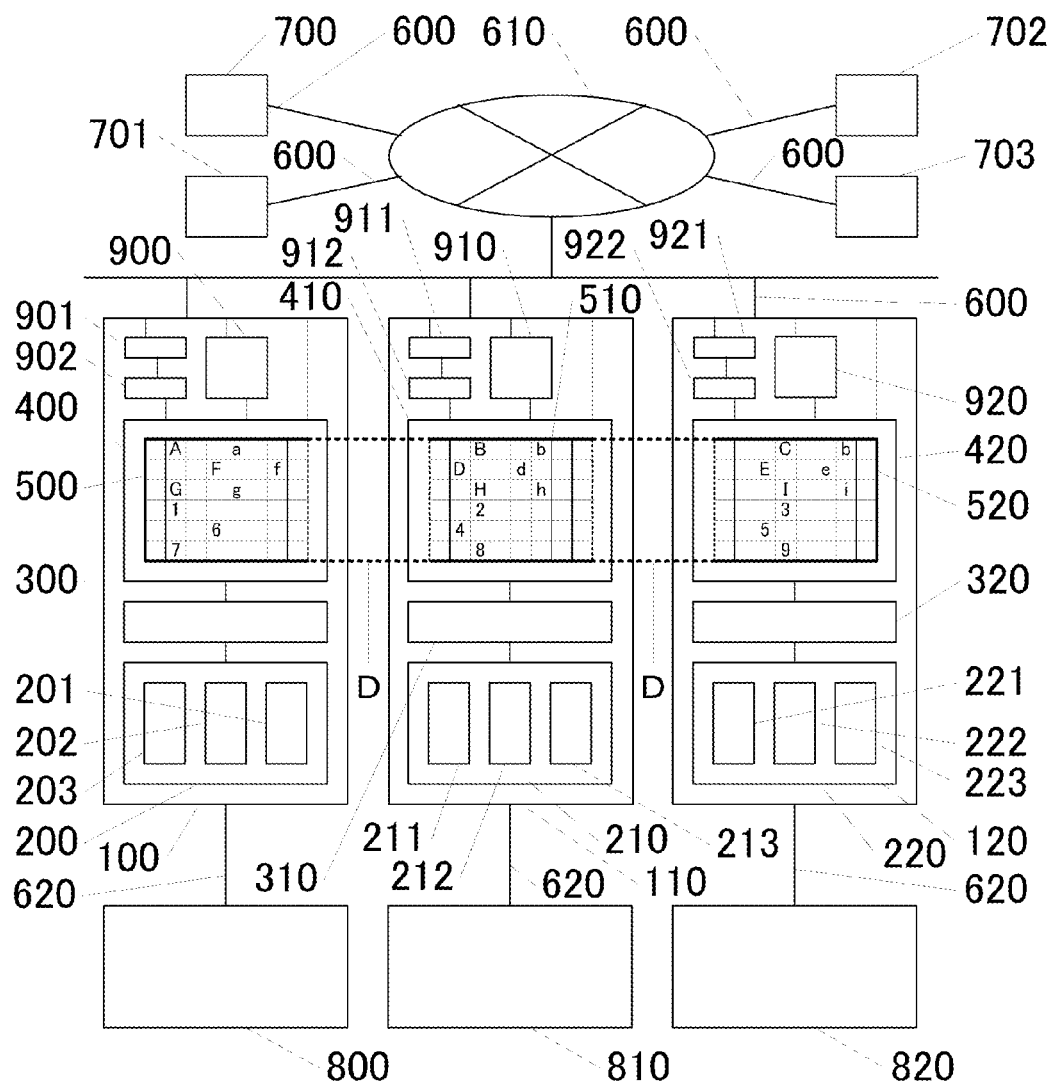
FIG. 15 is a component chart showing the structure of the distributed database system described in Claim 8 that uses partition topology technology. (Embodiment 13)

Using FIG. 15 and FIG. 21, said distributed database system described in Claim 8 applying the partition topology system is explained.

the distributed database system with shared meta information according to Embodiment 5, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having:

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

FIG. 15 is a component diagram of one of the embodiments of the presented invention, herein database domain 100 comprising to one server computer, database object set identifier converting portion 901 and database object set identifier location information converting portion 902 located inside database object management apparatus specific apparatus 907 on FIG. 21 (omitted on FIG. 15), distributed multi transaction processing apparatus 900 located inside distributed multi transaction process executing portion 906 on FIG. 19 (omitted on FIG. 15), database meta information storage management portion 500 located inside database meta information repository management apparatus 400, and database object management apparatus 300, database object storage apparatus 200 are located inside database domain 100, and the storage server computer which has storage 800 storing snapshots and journals for restoration when damage occurs is connected to database domain 100 via network 600, and both database domain 110 and database domain 120 have a structure sane as database domain 100 which are connected via LAN 600, and the partition caches inside database meta information management storage portion 500 are partitioned and shared by the partition topology technology described in Non Patent Reference Document 1, and the distributed database achieves real time updates at high speed by synchronizing the meta information.

Storage 800 shown in FIG. 15 can exist at a long distance which is connected to database domain 100 via WAN.

Storage 800 shown in FIG. 15 can be a secondary storage device connected via an interface cable such as ATA, FC etc. controlled by a single server computer which a database domain 100 comprises to.

Relation 201, 202, 203, 204, 205, 206, 207, 208 and 209 shown in FIG. 15 can have any tuple group which is divided horizontally from a huge number of tuples, or tuples can be contained in relations like relation 201 and relation 203, located in the same database domain, or can be contained in relations like relation 201 and relation 211, located in the different database domains.

Tuple groups which are divided horizontally by a specified algorithm from a huge number of tuples in a single relation are defined as a database object set, and provided physical locations to store using a database object set identifier location information map table, but in order to adjust the balance of the usage status of storage destinations, re-allocation can be done dynamically.

Embodiment 14

Figure 16:
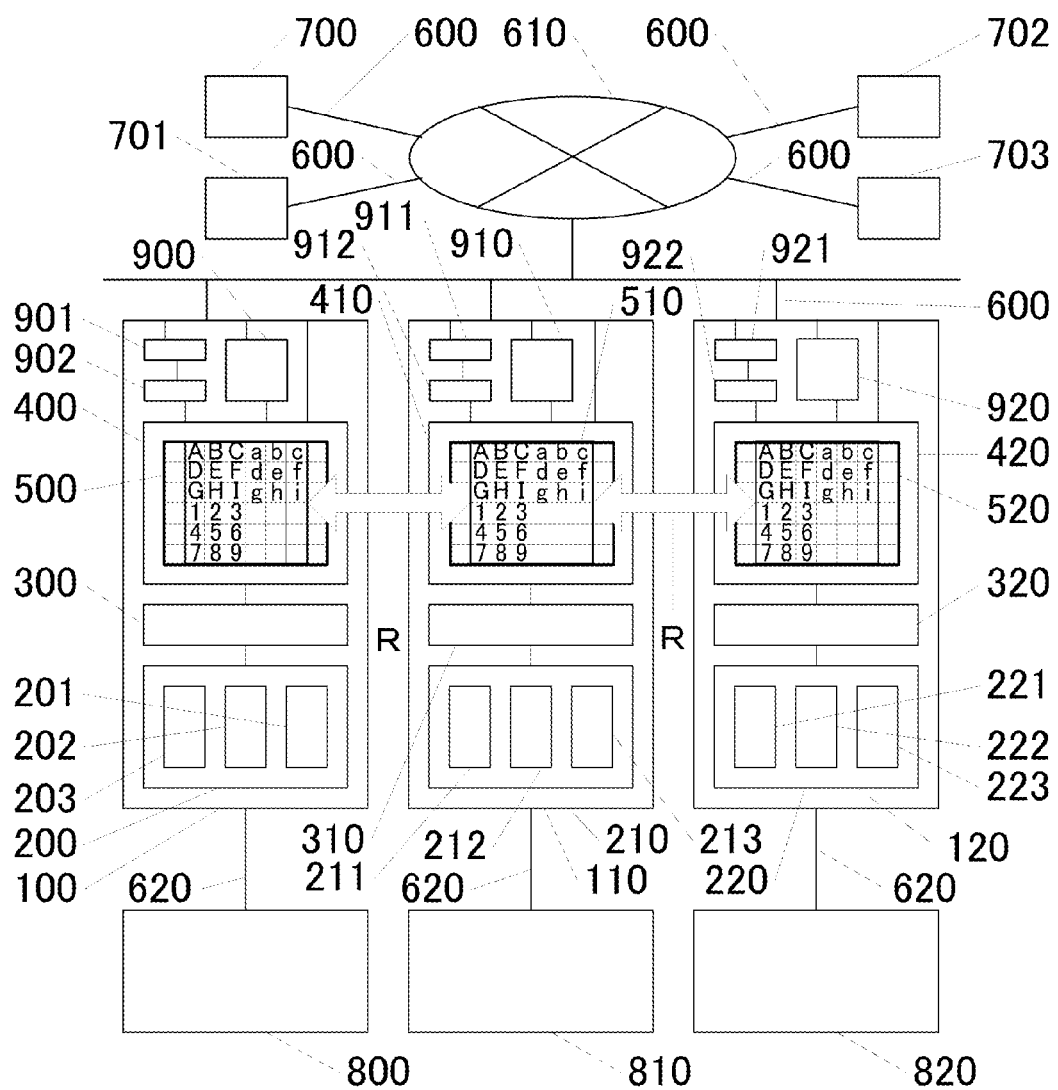
FIG. 16 is a component chart showing the structure of the distributed database system described in Claim 8 that uses replication technology system. (Embodiment 14)

Using FIG. 16 and FIG. 21, said distributed database system described in Claim 8 applying the replication topology system is explained.

the distributed database system with shared meta information according to Embodiment 6, and further characterized in below:

in two or more database domains located on network, said a distributed database system with shared meta information further comprising:

database object management apparatus specific apparatus 907 to associate the target data object with the data object management apparatuses 300, 310 and 320, in order to store tuples into database object storage apparatuses 200, 210 and 220 managed by database object management apparatuses managed in a plurality of database domains using horizontal partitioning when too many tuples cannot be stored in a single said database object storage apparatus as a single relation;

and processing apparatus for retrieved database objects in order to search or process or update database objects spread across a plurality of database domains;

said database object management apparatus specific apparatus 907 having:

database object set identifier converting portion 901, 911 and 921 which converts all or part of the information on the target database object used in specified parameters for the algorithm such as hashing etc. into database object set identifier that specify the database object set that logically houses the target database object;

and database object set identifier to location information converting portion 902, 912 and 922 which associates said database object set location information which specifies said database domain and said database object management apparatus where are physical location to store said database object set concerned corresponding to said database object set identifier concerned, and said database object set identifier concerned;

said processing apparatuses for retrieved database objects in order to search or process or update database objects having:

database object set identifier searching portion which searches one, or two or more database object set/sets across on one, or two or more database object storage apparatuses which are managed by said or two or more database object management apparatuses specifying said database object sets to be targets for searching using same said algorithm concerned with same parameters;

and database object set identifier processing portion which makes data which is specified and retrieved by said database object searching portion with specifying said data object sets concerned which will be target of processing have database object processing such as modifying or deletion or concatenation of data groups i.e. JOIN operation or PROJECTION operation, or TUPLE concatenation i.e. UNION etc. using same said algorithm concerned with same parameters;

said database meta information management repository apparatuses having;

herein there are two or more database domains which can communicate with each other on network, and herein database objects are identified by the database object identifier linked to the database object management apparatus identifier that is information to identify said database object management apparatus managing database objects concerned and by the database domain identifier to identify said database domain that manages database object management apparatuses concerned, the database object set identifier location information map tables which associate database object set location identifier to database object set location information which is held and maintained in said database object set identifier to location information converting portion of said database object management apparatus specific apparatus;

FIG. 16 is a component diagram of one of the embodiments of the presented invention, herein database domain 100 comprising to one server computer, database object set identifier converting portion 901 and database object set identifier location information converting portion 902 located inside database object management apparatus specific apparatus 907 on FIG. 21 (omitted on FIG. 16), distributed multi transaction processing apparatus 900 located inside distributed multi transaction process executing portion 906 on FIG. 19 (omitted on FIG. 16), database meta information storage management portion 500 located inside database meta information repository management apparatus 400, and database object management apparatus 300, database object storage apparatus 200 are located inside database domain 100, and the storage server computer which has storage 800 storing snapshots and journals for restoration when damage occurs is connected to database domain 100 via network 600, and both database domain 110 and database domain 120 have a structure sane as database domain 100 which are connected via LAN 600, and the partition caches inside database meta information management storage portion 500 are replicated and shared by the partition topology technology described in Non Patent Reference Document 1, and the distributed database achieves real time updates at high speed by synchronizing the meta information.

Storage 800 shown in FIG. 16 can exist at a long distance which is connected to database domain 100 via WAN.

Storage 800 shown in FIG. 16 can be a secondary storage device connected via an interface cable such as ATA, FC etc. controlled by a single server computer which a database domain 100 comprises to.

Relation 201, 202, 203, 204, 205, 206, 207, 208 and 209 shown in FIG. 16 can have any tuple group which is divided horizontally from a huge number of tuples, or tuples can be contained in relations like relation 201 and relation 203, located in the same database domain, or can be contained in relations like relation 201 and relation 211, located in the different database domains.

Tuple groups which are divided horizontally by a specified algorithm from a huge number of tuples in a single relation are defined as a database object set, and provided physical locations to store using a database object set identifier location information map table, but in order to adjust the balance of the usage status of storage destinations, re-allocation can be done dynamically.

Embodiment 15

Using FIG. 9 and FIG. 21, said distributed database system described in Claim 9 applying the partition topology technology is explained.

The distributed database system with shared meta information according to Embodiment 7, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

And using FIG. 10 and FIG. 21, said distributed database system described in Claim 9 applying the replication topology system is explained.

The distributed database system with shared meta information according to Embodiment 8, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

Embodiment 16

Using FIG. 11 and FIG. 21, said distributed database system described in Claim 10 applying the partition topology system is explained.

The distributed database system with shared meta information according to Embodiment 9, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

And using FIG. 10 and FIG. 21, said distributed database system described in Claim 10 applying the replication topology system is explained.

The distributed database system with shared meta information according to Embodiment 10, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

Embodiment 17

Using FIG. 13 and FIG. 21, said distributed database system described in Claim 11 applying the partition topology system is explained.

The distributed database system with shared meta information according to Embodiment 11, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

And using FIG. 14 and FIG. 21, said distributed database system described in Claim 11 applying the replication topology system is explained.

The distributed database system with shared meta information according to Embodiment 12, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

Embodiment 18

Using FIG. 15 and FIG. 21, said distributed database system described in Claim 12 applying the partition topology system is explained.

The distributed database system with shared meta information according to Embodiment 13, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

And using FIG. 16 and FIG. 21, said distributed database system described in Claim 12 applying the replication topology system is explained.

The distributed database system with shared meta information according to Embodiment 14, and further characterized in below:

said database object management apparatus specific apparatus 907 having functions to modify location information of database object set identifier to location information converting portions 902, 912 and 922, and to relocate to optimize between size of database object set to be stored and capacity of memory storage of said database object storage apparatuses 200, 210 and 220.

Embodiment 19

Using FIG. 17 and FIG. 18 and FIG. 19 and FIG. 22, said distributed multi transaction control system described in Claim 2 applying the access counter technology is explained.

The distributed multi transaction control system characterized in below:

located on the network 900, said distributed multi distributed transaction control system comprising:

one or more database object management apparatus/apparatuses 300 managing database/databases;

and one or more database object storage apparatus/apparatuses 200 corresponding to each said database object management apparatus/apparatuses 300 in order to store database/databases managed by said database object management apparatus/apparatuses 300;

and distributed multi transaction processing apparatus/apparatuses 900 for implementing and maintaining transaction consistency in distributed multi transaction processing;

and one or more database meta information management repository apparatus/apparatuses 400 in order to manage meta information held by said database/databases;

said one or more database meta information management repository apparatus/apparatuses 400 having:

update access counter/counters 903 which is/are characterized to be identified by the process identifier which identifies the process which is the starting point of one or more said update access/accesses requested;

like described in FIG. 19, said distributed multi transaction processing apparatus/apparatuses 900 has/have distributed multi transaction process executing portion 907 characterized in below:

in transaction processing for database object/objects which is/are requested from client computer/computers or server computer/computers to access as one or more update process/processes such as insertion or modification or deletion directly or indirectly, and is/are managed by database object management apparatus/apparatuses, like described in FIG. 17, herein said update access counter has initial value specified beforehand, the count in said update access counter concerned which is identified by process identifier which identifies the process which is the starting point of said update access/accesses concerned is counted up by the constant number each time when update access/accesses is/are occurred requested by the process/processes or thread/threads on the client computer/computers or server computer/computers inside its/their own said database domain if said process/processes or thread/threads which is/are caused by the starting process itself or process/processes which is/are caused by the starting process, directly or indirectly exist/exists;

and the count in said update access counter which is identified by process identifier which identifies the process which is the starting point of said update access/accesses concerned is counted down by the constant number same as said constant number concerned each time when the information that actual update access succeeded reach to said distributed multi transaction processing apparatus/apparatuses;

and when the value of said counter concerned matches said initial value concerned, commit operation/operations is/are executed for all update access/accesses executed by the process/processes or thread/threads which is/are caused by the starting process itself or process/processes which is/are caused by the starting process directly or indirectly on the client computer/computers or server computer/computers inside its/their own database domain directly or indirectly;

and like described in FIG. 18, in case of that the information that actual update access failed reach to said distributed multi transaction processing apparatus/apparatuses, further update access/accesses is/are stopped, and without waiting for the result/results, rollback operation/operations for all update access/accesses executed already by the process/processes or thread/threads which is/are caused directly or indirectly by the starting process itself or process/processes or thread/threads if exists/exist on the client computer/computers or server computer/computers inside its/their own database domain is executed promptly.

INDUSTRIAL FIELD APPLICATION

By partitioning huge scale database system as far as possible into functioning as independent databases, and Loose-coupling and Re-uniting these partitioned databases, a huge scale distributed database system of the same scale is provided. Accompanying the large capacity and low price of main memory apparatus in recent years, miniaturized independent databases are installed in low cost server devices as In-memory databases that do not include at all time-consuming heavy processing such as serialize, de-serialize. When these cheap database server devices are linked together in huge numbers by high speed network technology such as InfiniBand etc., when database server apparatus are dynamically added, and even when damage occurs to part of the database server apparatus and they must be cut off, the effect can be localized and when the damage has been eliminated, the snapshot and journal for the starting point of the roll forward is also minimized to the localized damage, and a grid database system can be provided capable of recovery in a short time and real time updating.

Plug-in Database Server Appliance which assumes that said database domain construction is one unit can be constructed, and the said plug-in database server appliances can be located in a racks in the data center, connected each other, and provided the huge scale grid database system which can scale-out.

REFERENCE NUMERALS 100, 110 and 120 database domain
200, 210 and 220 database object storage apparatus
201, 202, 203, 211, 212,
213, 221, 222 and 223 relation
300, 310 and 320 database object management apparatus
400, 410 and 420 database meta information repository management apparatus
500, 510 and 520 database meta information storage management portion
600 LAN, WAN TCP/IP network
610 internet network
908 interface cable of TCP/IP network or ATA, FC etc.
700, 710, 720 and 730 terminal computer
800, 810 and 820 data storage
900, 910 and 920 distributed multi transaction processing apparatus
901, 911 and 921 database object set identifier converting portion
902, 912 and 922 database object set location information converting portion
903 update access counter
905 database object set identifier location information map table
906 distributed multi transaction process executing portion
907 database object management device specific device
908 LAN, WAN or TCP/IP network inside machine
1000 Start Process
1001 DB Update Process 1
1002 Issued Process 1
1003 DB Update Process 2
1004 Issued Process 2
1005 DB Update Process 3
1006 Distributed Multi Transaction Processor Device
1007 Update Counter which belongs to Start Process ID
1100 Orders DB Update
1101 Informs Update Success
1102 Orders making the Update Counter be UP
1103 Orders making the Update Counter be DOWN
1104 Message of All Commit Order
1105 Kicks Other Process
1106 Message to make the Counter Value be UP
1107 Message to make the Counter Value be DOWN
1108 The Counter Value Updated
1109 Message to make the DB be Committed
1110 The Counter is Released
1111 Message of All Rollback Order
1112 Message to make the DB be Roll backed
1113 Initializes the Counter Value
1114 Informs Update Failure
1115 Message to make the Counter Value be Initialize
1200 Update in Success
1201 Update in Failure
1202 Is the Counter Value equal to Initial Value?

What is claimed is:

1. The distributed database system with shared meta information characterized in below:

in two or more database domains, the database domains comprise one or more computer/computers which comprise a processor and memory, located on network/networks, said a distributed database system with shared meta information comprising:

one or more database object management apparatus/apparatuses managing database/databases;

and one or more database object storage apparatus/apparatuses corresponding to each said database object management apparatus/apparatuses in order to store database/databases managed by said database object management apparatus/apparatuses;

and one or more database meta information management repository apparatus/apparatuses in order to keep integrity with external other database domain/domains by meta information held by said database/databases;

said database meta information management repository apparatus/apparatuses, herein there are two or more database domains which can communicate with each other on network/networks, and herein database object/objects is/are identified:

by the database object identifier linked to the database object management apparatus identifier that is information to identify said database object management apparatus managing database object/objects concerned, and by the database domain identifier to identify said database domain that manages database object management apparatus/apparatuses concerned;

storing as database meta information of the distributed database system:

the data dictionary information defining the structure of the database saved and maintained by the database object management apparatus within its own database domain;

and status information concerning both database object/objects in reference state and database object/objects in referenced state, when database objects within each database object management apparatus within its own database domain are in foreign reference state concerning one or more database object/objects managed by database object management apparatus/apparatuses within other said database domain/domains;

and status information on said database object/objects in shared lock status while said database object/objects managed by said database object management apparatus/apparatuses within its own said database domain is in read state from client computer/computers or server computer/computers that directly or indirectly access said database meta information management repository apparatus/apparatuses managing other said database domain/domains;

and status information on said database object/objects in exclusive lock status while said database object/objects managed by said database object management apparatus/apparatuses within its own said database domain is write state from client computer/computers, or server computer/computers that directly or indirectly access said database meta information management repository apparatus/apparatuses managing other said database domain/domains;

and having:

database meta information storage management portion which updates and maintains status information about said database object/objects rapidly, when processing proceeds inside its own database domain and event/events causing change/changes status information about said database object/objects occurs/occur;

and memory cache/caches comprise/comprises:

'part of the main memory apparatus/apparatuses' of each node which is the server computer implemented as said database meta information management repository apparatus 'in the database domain participating in said distributed database';

and a single virtual main memory apparatus comprises said memory cache/caches;

and is realized by one of

'said memory cache/caches of its/their own node and other node/nodes shared mutually between nodes as a memory image' and 'said memory cache/caches of its/their own node and other node/nodes replicated mutually between nodes as a memory image, and held, and accompanying changes in data base meta information, memory image of said memory cache concerning said change on said node concerning said change is synchronized by replication on memory cache corresponding on another node';

and said database meta information storage management portion of its own database meta information management repository apparatus, and said database meta information storage management portion of said database meta information management repository apparatus inside the other database domain, can be shared with each meta information management repository apparatus said 'in the database domain participating in 30 said distributed database'.

2. The distributed database system with shared meta information characterized in below:

in two or more database domains, the database domains comprise one or more computer/computers which comprise a processor and memory, located on network/networks, said a distributed database system with shared meta information comprising one or more distributed multi transaction control systems/systems characterized in below:

located on the network, said distributed multi distributed transaction control system comprising:

one or more database object management apparatus/apparatuses managing database/databases;

and one or more database object storage apparatus/apparatuses corresponding to each said database object management apparatus/apparatuses in order to store database/databases managed by said database object management apparatus/apparatuses;

and distributed multi transaction processing apparatus/apparatuses for implementing and maintaining transaction consistency in distributed multi transaction processing;

and one or more database meta information management repository apparatus/apparatuses in order to manage meta information held by said database/databases;

said one or more database meta information management repository apparatus/apparatuses having:

update access counter/counters which is/are characterized to be identified by the process identifier which identifies the process which is the starting point of one or more said update access/accesses requested;

said distributed multi transaction processing apparatus/apparatuses has/have distributed multi transaction process executing portion characterized in below:

in transaction processing for database object/objects which is/are requested from client computer/computers or server computer/computers to access as one or more update process/processes such as insertion or modification or deletion directly or indirectly, and is/are managed by database object management apparatus/apparatuses, herein said update access counter has initial value specified beforehand, the count in said update access counter concerned which is identified by process identifier which identifies the process which is the starting point of said update access/accesses concerned is counted up by the constant number each time when update access/accesses is/are occurred requested by the process/processes or thread/threads on the client computer/computers or server computer/computers inside its/their own said database domain if said process/processes or thread/threads which is/are caused by the starting process itself or process/processes which is/are caused by the starting process, directly or indirectly exist/exists;

and the count in said update access counter which is identified by process identifier which identifies the process which is the starting point of said update access/accesses concerned is counted down by the constant number same as said constant number concerned each time when the information that actual update access succeeded reach to said distributed multi transaction processing apparatus/apparatuses;

and when the value of said counter concerned matches said initial value concerned, commit operation/operations is/are executed for all update access/accesses executed by the process/processes or thread/threads which is/are caused by the starting process itself or process/processes which is/are caused by the starting process directly or indirectly on the client computer/computers or server computer/computers inside its/their own database domain directly or indirectly;

and in case of that the information that actual update access failed reach to said distributed multi transaction processing apparatus/apparatuses, further update access/accesses is/are stopped, and without waiting for the result/results, rollback operation/operations for all update access/accesses executed already by the process/processes or thread/threads which is/are caused directly or indirectly by the starting process itself or process/processes or thread/threads if exists/exist on the client computer/computers or server computer/computers inside its/their own database domain is executed promptly;

in addition, further more characterized in below:

herein database meta information management repository apparatus/apparatuses in order to keep integrity with external other database domain/domains by meta information held by said database/databases;

herein distributed multi transaction process executing portion further characterized in below:

herein there are two or more database domains which can communicate with each other on network/networks, and herein database object/objects is/are identified by:

the database object identifier linked to the database object management apparatus identifier that is information to identify said database object management apparatus managing database object/objects concerned;

and the database domain identifier to identify said database domain that manages database object management apparatus/apparatuses concerned; in transaction processing for database object/objects which is/are requested from client computer/computers or server computer/computers to access as one or more update process/processes such as insertion or modification or deletion directly or indirectly, and is/are managed by database object management apparatus/apparatuses inside its own or the other said database domain/domains, herein update access counter identified by process identifier to identify the process which is the starting point of one or more update access/accesses requested from two or more database domains, exists, the count in said update access counter which is identified by process identifier which identifies the process which is the starting point of said update access/accesses concerned is counted up by the constant number each time when update access/accesses is/are occurred requested by the process/processes or thread/threads on the client computer/computers or server computer/computers inside its/their own or the other said database domain/domains if said process/processes or thread/threads which is/are caused by i0 the starting process itself or process/processes which is/are caused by the starting process directly or indirectly, exist/exists;

and when the value of said counter concerned matches said initial value concerned, commit operation/operations is/are executed for all update access/accesses executed by the process/processes or thread/threads which is/are caused by the starting process itself or process/processes which is/are caused by the starting process directly or indirectly on the client computer/computers or server computer/computers inside its/their own or other database domain/domains directly or indirectly;

and in case of that the information that actual update access failed reach to said distributed multi transaction processing apparatus/apparatuses, further update access/accesses is/are stopped, and without waiting for the result/results, rollback operation/operations for all update access/accesses executed already by the process/processes or thread/threads which is/are caused directly or indirectly by the starting process itself or process/processes or thread/threads if exists/exist on the client computer/computers or server computer/computers inside its/their own or other database domain/domains is/are executed promptly, said database meta information management repository apparatus/apparatuses having:

herein there are two or more database domains which can communicate with each other on network/networks, update access counter/counters identified by the process identifier which identifies the process which is the starting point of one or more said update access/accesses requested by a plurality of database domains;

and memory cache/caches comprise/comprises:

'part of the main memory apparatus/apparatuses' of each node which is the server computer implemented as said database meta information management repository apparatus 'in the database domain participating in said distributed database';

and a single virtual main memory apparatus comprises said memory cache/caches;

and is realized by one of

'said memory cache/caches of its/their own node and other node/nodes shared mutually between nodes as a memory image' and 'said memory cache/caches of its/their own node and other node/nodes replicated mutually between nodes as a memory image, and held, and accompanying changes in data base meta information, memory image of said memory cache concerning said change on said node concerning said change is synchronized by replication on memory cache corresponding on another node';

and said database meta information storage management portion of its own database meta information management repository apparatus, and said database meta information storage management portion of said database meta information management repository apparatus inside the other database domain, can be shared with each meta information management repository apparatus said 'in the database domain participating in said distributed database'.

3. The distributed database system with shared meta information according to claim 1, and further characterized in below:

in two or more database domains located on network/networks, said a distributed database system with shared meta information further comprising:

and distributed multi transaction processing apparatus/apparatuses for implementing and maintaining transaction consistency in distributed multi transaction processing;

said distributed multi transaction processing apparatus/apparatuses has/have distributed multi transaction process executing portion characterized in below: herein there are two or more database domains which can communicate with each other on network/networks,
and herein database object/objects is/are identified by:
the database object identifier linked to the database object management apparatus identifier that is information to identify said database object management apparatus managing database object/objects concerned;
and the database domain identifier to identify said database domain that manages database object management apparatus/apparatuses concerned;
in transaction processing for database object/objects which is/are requested from client computer/computers or server computer/computers to access as one or more update process/processes such as insertion or modification or deletion directly or indirectly, and is/are managed by database object management apparatus/apparatuses inside its own or the other said database domain/domains,
herein update access counter identified by process identifier to identify the process which is the starting point of one or more update access/accesses requested from two or more database domains, exists,
herein said update access counter has initial value specified beforehand,
the count in said update access counter which is identified by process identifier which identifies the process which is the starting point of said update access/accesses concerned is counted up by the constant number each time when update access/accesses is/are occurred requested by the process/processes or thread/threads on the client computer/computers or server computer/computers inside its/their own or the other said database domain/domains if said process/processes or thread/threads which is/are caused by the starting process itself or process/processes which is/are caused by the starting process directly or indirectly, exist/exists;
and the count in said update access counter which is identified by process identifier which identifies the process which is the starting point of said update access/accesses concerned is counted down by the constant number same as said constant number concerned each time when the information that actual update access succeeded reach to said distributed multi transaction processing apparatus/apparatuses,
and when the value of said counter concerned matches said initial value concerned, commit operation/operations is/are executed for all update access/accesses executed by the process/processes or thread/threads which is/are caused by the starting process itself or process/processes which is/are caused by the starting process directly or indirectly on the client computer/computers or server computer/computers inside its/their own or other database domain/domains directly or indirectly;
and in case of that the information that actual update access failed reach to said distributed multi transaction processing apparatus/apparatuses, further update access/accesses is/are stopped, and without waiting for the result/results, rollback operation/operations for all update access/accesses executed already by the process/processes or thread/threads which is/are caused directly or indirectly by the starting process itself or process/processes or thread/threads if exists/exist on the client computer/computers or server computer/computers inside its/their own or other database domain/domains is/are executed promptly,
said database meta information management repository apparatus/apparatuses having:
herein there are two or more database domains which can communicate with each other on network/networks,
update access counter/counters identified by the process identifier which identifies the process which is the starting point of one or more said update access/accesses requested by a plurality of database domains.

4. The distributed database system with shared meta information characterized in below:
in two or more database domains, the database domains comprise one or more computer/computers which comprise a processor and memory, located on network/networks, said a distributed database system with shared meta information comprising:
one or more database object management apparatus/apparatuses managing database/databases;
and one or more database object storage apparatus/apparatuses corresponding to each said database object management apparatus/apparatuses in order to store database/databases managed by said database object management apparatus/apparatuses;
and database object management apparatus/apparatuses specific apparatus/apparatuses to associate the target data object with the data object management apparatus, in order to store tuples into one, two or more database object storage apparatus/apparatuses managed by one, two or more database object management apparatus/apparatuses managed in a plurality of database domains using horizontal 20 partitioning when too many tuples cannot be stored in a single said database object storage apparatus as a single relation;
and processing apparatus/apparatuses for retrieved database object/objects in order to search or process or update database objects objects/objects which is/are in a plurality of database domains;
and one or more database meta information management repository apparatus/apparatuses in order to keep integrity with external other database domain/domains by meta information held by said database/databases;
said database object management apparatus/apparatuses specific apparatus/apparatuses having:
database object set identifier converting portion which converts all or part of the information on the target database object used in specified parameter/parameters for algorithm/algorithms such as hashing etc. into database object set identifier that specify the database object set that logically houses the target database object;
and database object set identifier to location information converting portion which associates said database object set location information which specifies said database domain and said database object management apparatus where are physical location to store said database object set concerned corresponding to said database object set identifier concerned, and said database object set identifier concerned;
said processing apparatus/apparatuses for retrieved database object/objects in order to search or process or update database objects having:
database object set identifier searching portion which searches one or more database object set/sets from one or more database object storage apparatus/apparatuses which is/are managed by said one or more database object management apparatus/apparatuses which specify/specifies said database object set/sets to be targets for searching using same said algorithm/algorithms concerned with same parameter/parameters;
and database object set identifier processing portion which makes data which is specified and retrieved by said database object searching portion which specifies said data object set/sets concerned which will be target of processing have database object processing such as modifying or deletion or concatenation of data groups i.e. JOIN operation or PROJECTION operation, or TUPLE concatenation i.e. UNION etc. using same said algorithm/algorithms concerned with same parameter/parameters;

said database meta information management repository apparatus/apparatuses having:

herein there are two or more database domains which can communicate with each other on network/networks, and herein database object/objects is/are identified by the database object identifier linked to the database object management apparatus identifier that is information to identify said database object management apparatus managing database object/objects concerned and by the database domain identifier to identify said database domain that manages database object management apparatus/apparatuses concerned, the database object set identifier location information map table/tables which associates/associate database object set location identifier to database object set location information which is held and maintained in said database object set identifier location information converting portion of said database object management apparatus specific apparatus;

and memory cache/caches comprise/comprises: 'part of the main memory apparatus/apparatuses' of each node which is the server computer implemented as said database meta information management repository apparatus 'in the database domain participating in said distributed database';

and a single virtual main memory apparatus comprises said memory cache/caches;

and is realized by one of

'said memory cache/caches of its/their own node and other node/nodes shared mutually between nodes as a memory image' and 'said memory cache/caches of its/their own node and other node/nodes replicated mutually between nodes as a memory image, and held, and accompanying changes in data base meta information, memory image of said memory cache concerning said change on said node concerning said change is synchronized by replication on memory cache corresponding on another node';

and said database meta information storage management portion of its own database meta information management repository apparatus, and said database meta i0 information storage management portion of said database meta information management repository apparatus inside the other database domain, can be shared with each meta information management repository apparatus said 'in the database domain participating in said distributed database'.

5. The distributed database system with shared meta information according to claim 1, and further characterized in below:

in two or more database domains located on network/networks, said a distributed database system with shared meta information further comprising:

database object management apparatus/apparatuses specific apparatus/apparatuses to associate the target data object with the data object management apparatus, in order to store tuples into one, two or more database object storage apparatus/apparatuses managed by one, two or more database object management apparatus/apparatuses managed in a plurality of database domains using horizontal partitioning when too many tuples cannot be stored in a single said database object storage apparatus as a single relation;

and processing apparatus/apparatuses for retrieved database object/objects in order to search or process or update database object/objects which is/are in a plurality of database domains;

said database object management apparatus/apparatuses specific apparatus/apparatuses having:

database object set identifier converting portion which converts all or part of the information on the target database object used in specified parameter/parameters for algorithm/algorithms such as hashing etc. into database object set identifier that specify the database object set that logically houses the target database object;

and database object set identifier to location information converting portion which associates said database object set location information which specifies said database domain and said database object management apparatus where are physical location to store said database object set concerned corresponding to said database object set identifier concerned, and said database object set identifier concerned;

said processing apparatus/apparatuses for retrieved database object/objects in order to search or process or update database objects having:

database object set identifier searching portion which searches one or more database object set/sets from one or more database object storage apparatus/apparatuses which is/are managed by said one or more database object management apparatus/apparatuses which specify/specifies said database object set/sets to be targets for searching using same said algorithm/algorithms concerned with same parameter/parameters;

and database object set identifier processing portion which makes data which is specified and retrieved by said database object searching portion which specifies said data object set/sets concerned which will be target of processing have database object processing such as modifying or deletion or concatenation of data groups i.e. JOIN operation or PROJECTION operation, or TUPLE concatenation i.e. UNION etc. using same said algorithm/algorithms concerned with same parameter/parameters;

said database meta information management repository apparatus/apparatuses having:

herein there are two or more database domains which can communicate with each other on network/networks, and herein database object/objects is/are identified by the database object identifier linked to the database object management apparatus identifier that is information to identify said database object management apparatus managing database object/objects concerned and by the database domain identifier to identify said database domain that manages database object management apparatus/apparatuses concerned, the database object set identifier location information map table/tables which associates/associate database object set location identifier to database object set location information which is held and maintained in said database object set identifier to location information converting portion of said database object management apparatus specific 30 apparatus.

6. The distributed database system with shared meta information according to claim 2, and further characterized in below:

in two or more database domains located on network/networks, said a distributed database system with shared meta information further comprising:

database object management apparatus/apparatuses specific apparatus/apparatuses to associate the target data object with the data object management apparatus, in order to store tuples into one, two or more database object storage apparatus/apparatuses managed by one, two or more database object management apparatus/apparatuses managed in a plurality of database domains using horizontal partitioning when too many tuples cannot be stored in a single said database object storage apparatus as a single relation;

and processing apparatus/apparatuses for retrieved database object/objects in order to search or process or update database object/objects which is/are in a plurality of database domains;

said database object management apparatus/apparatuses specific apparatus/apparatuses having:

database object set identifier converting portion which converts all or part of the information on the target database object used in specified parameter/parameters for algorithm/algorithms such as hashing etc. into database object set identifier that specify the database object set that logically houses the target database object;

and database object set identifier to location information converting portion which associates said database object set location information which specifies said database domain and said database object management apparatus where are physical location to store said database object set concerned corresponding to said database object set identifier concerned, and said database object set identifier concerned;

said processing apparatus/apparatuses for retrieved database object/objects in order to search or process or update database objects having:

database object set identifier searching portion which searches one or more a database object set/sets from one or more database object storage apparatus/apparatuses which is/are managed by said one or more database object management apparatus/apparatuses which specify/specifies said database object set/sets to be targets for searching using same said algorithm/algorithms concerned with same parameter/parameters;

and database object set identifier processing portion which makes data which is specified and retrieved by said database object searching portion which specifies said data object set/sets concerned which will be target of processing have database object processing such as modifying or deletion or concatenation of data groups i.e. JOIN operation or PROJECTION operation, or TUPLE concatenation i.e. UNION etc. using same said algorithm/algorithms concerned with same parameter/parameters;

said database meta information management repository apparatus/apparatuses having:

herein there are two or more database domains which can communicate with each other on network/networks, and herein database object/objects is/are identified by the database object identifier linked to the database object management apparatus identifier that is information to identify said database object management apparatus managing database object/objects concerned and by the database domain identifier to identify said database domain that manages database object management apparatus/apparatuses concerned, the database object set identifier location information map table/tables which associates/associate database object set location identifier to database object set location information which is held and maintained in said database object set identifier to location information converting portion of said database object management apparatus specific apparatus.

7. The distributed database system with shared meta information according to claim 3, and further characterized in below:

in two or more database domains located on network/networks, said a distributed database system with shared meta information further comprising:

database object management apparatus/apparatuses specific apparatus/apparatuses to associate the target data object with the data object management apparatus, in order to store tuples into one, two or more database object storage 20 apparatus/apparatuses managed by one, two or more database object management apparatus/apparatuses managed in a plurality of database domains using horizontal partitioning when too many tuples cannot be stored in a single said database object storage apparatus as a single relation;

and processing apparatus/apparatuses for retrieved database object/objects in order to search or process or update database object/objects which is/are in a plurality of database domains; said database object management apparatus/apparatuses specific apparatus/apparatuses having:

database object set identifier converting portion which converts all or part of the information on the target database object used in specified parameter/parameters for algorithm/algorithms such as hashing etc. into database object set identifier that specify the database object set that logically houses the target database object;

and database object set identifier to location information converting portion which associates said database object set location information which specifies said database domain and said database object management apparatus where are physical location to store said database object set concerned corresponding to said database object set identifier concerned, and said database object set identifier concerned;

said processing apparatus/apparatuses for retrieved database object/objects in order to search or process or update database objects having:

database object set identifier searching portion which searches one or more database object set/sets from one or more database object storage apparatus/apparatuses which is/are managed by said one or more database object management apparatus/apparatuses which specify/specifies said database object set/sets to be targets for searching using same said algorithm/algorithms concerned with same parameter/parameters;

and database object set identifier processing portion which makes data which is specified and retrieved by said database object searching portion which specifies said data object set/sets concerned which will be target of processing have database object processing such as modifying or deletion or concatenation of data groups i.e. JOIN operation or PROJECTION operation, or TUPLE concatenation i.e. UNION etc. using same said algorithm/algorithms concerned with same parameter/parameters;

said database meta information management repository apparatus/apparatuses having:

herein there are two or more database domains which can communicate with each other on network/networks, and herein database object/objects is/are identified by the database object identifier linked to the database object management apparatus identifier that is information to identify said database object management apparatus managing database object/objects concerned and by the database domain identifier to identify said database domain that manages database object management apparatus/apparatuses concerned, the database object set identifier location information map table/tables which associates/associate database object set location identifier to database object set location information which is held and maintained in said database object set identifier to location information converting portion of said database object management apparatus specific apparatus.

8. The distributed database system with shared meta information according to claim 4 and further characterized in below:

said database object management apparatus/apparatuses specific apparatus/apparatuses having functions to modify location information of database object set identifier to location information converting portion, and to relocate to optimize between size of database object set to be stored and capacity of memory storage of said database object storage apparatus/apparatuses.

9. The distributed database system with shared meta information according to claim 5, and further characterized in below:

said database object management apparatus/apparatuses specific apparatus/apparatuses having functions to modify location information of database object set identifier to location information converting portion, and to relocate to optimize between size of database object set to be stored and capacity of memory storage of said database object storage apparatus/apparatuses.

10. The distributed database system with shared meta information according to claim 5, and further characterized in below:

said database object management apparatus/apparatuses specific apparatus/apparatuses having functions to modify location information of database object set identifier to location information converting portion, and to relocate to optimize between size of database object set to be stored and capacity of memory storage of said database object storage apparatus/apparatuses.

11. The distributed database system with shared meta information according to claim 7, and further characterized in below:

said database object management apparatus/apparatuses specific apparatus/apparatuses having functions to modify location information of database object set identifier to location information converting portion, and to relocate to optimize between size of database object set to be stored and capacity of memory storage of said database object storage apparatus/apparatuses.

* * * * *

UNITED STATES PATENT AND TRADEMARK OFFICE
CERTIFICATE OF CORRECTION

| | |
|---|---|
| PATENT NO. | : 8,140,498 B2 |
| APPLICATION NO. | : 12/778124 |
| DATED | : March 20, 2012 |
| INVENTOR(S) | : Nishiyama |

It is certified that error appears in the above-identified patent and that said Letters Patent is hereby corrected as shown below:

Column 9 Line 29
    described in Claim 3 applying the replication topology sys-
should be
    described in Claim 2 applying the replication topology sys- Column 11 Line 8
    described in Claim 3 applying the replication topology sys-
should be
    described in Claim 2 applying the replication topology sys- Column 12 Line 60
    described in Claim 4 applying the partition topology system
should be
    described in Claim 3 applying the partition topology system Column 14 Line 13
    described in Claim 4 applying the partition topology system
should be
    described in Claim 3 applying the partition topology system Column 15 Line 35
    described in Claim 5 applying the partition topology system
should be
    described in Claim 4 applying the partition topology system Column 16 Line 66
    tem described in Claim 5 applying the partition topology
should be
    tem described in Claim 4 applying the partition topology Signed and Sealed this
Third Day of July, 2012

David J. Kappos
*Director of the United States Patent and Trademark Office*

Column 18 Line 37
  tem described in Claim 6 applying the partition topology
should be
  tem described in Claim 5 applying the partition topology Column 19 Line 44
  tem described in Claim 6 applying the partition topology
should be
  tem described in Claim 5 applying the partition topology Column 20 Line 52
  tem described in Claim 7 applying the partition topology
should be
  tem described in Claim 6 applying the partition topology Column 21 Line 60
  tem described in Claim 7 applying the partition topology
should be
  tem described in Claim 6 applying the partition topology Column 22 Line 66
  tem described in Claim 8 applying the partition topology
should be
  tem described in Claim 7 applying the partition topology Column 24 Line 52
  tem described in Claim 8 applying the partition topology
should be
  tem described in Claim 7 applying the partition topology Column 26 Line 37
  described in Claim 9 applying the partition topology technol-
should be
  described in Claim 8 applying the partition topology technol- Column 26 Line 66
  tem described in Claim 10 applying the partition topology
should be
  tem described in Claim 9 applying the partition topology Column 27 Line 29
  tem described in Claim 11 applying the partition topology
should be
  tem described in Claim 10 applying the partition topology

CERTIFICATE OF CORRECTION (continued)
U.S. Pat. No. 8,140,498 B2

Column 27 Line 59
                tem described in Claim 12 applying the partition topology
should be
                tem described in Claim 11 applying the partition topology Column 36 Line 33 (Claim 4)
                update database object objects/objects which is/are in a
should be
                update database object/objects which is/are in a Column 42 Line 11 (Claim 10)
                information according to claim 5, and further characterized in
should be
                information according to claim 6, and further characterized in